US009107081B1

(12) United States Patent
Pezeshkian et al.

(10) Patent No.: US 9,107,081 B1
(45) Date of Patent: Aug. 11, 2015

(54) METHOD OF MAINTAINING AN AD HOC COMMUNICATIONS NETWORK BETWEEN A BASE AND A MOBILE PLATFORM

(71) Applicants: Narek Pezeshkian, Glendale, CA (US); Kevin Holz, San Diego, CA (US); Aaron Bruce Burmeister, San Diego, CA (US); Abraham B. Hart, San Diego, CA (US); Hoa G. Nguyen, San Diego, CA (US); Leif E. Roth, San Diego, CA (US)

(72) Inventors: Narek Pezeshkian, Glendale, CA (US); Kevin Holz, San Diego, CA (US); Aaron Bruce Burmeister, San Diego, CA (US); Abraham B. Hart, San Diego, CA (US); Hoa G. Nguyen, San Diego, CA (US); Leif E. Roth, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 235 days.

(21) Appl. No.: 13/919,785

(22) Filed: Jun. 17, 2013

Related U.S. Application Data

(63) Continuation-in-part of application No. 13/470,850, filed on May 14, 2012, and a continuation-in-part of application No. 11/832,103, filed on Aug. 1, 2007, now Pat. No. 8,909,130.

(60) Provisional application No. 61/617,183, filed on Mar. 29, 2012, provisional application No. 60/860,235, filed on Nov. 8, 2006.

(51) Int. Cl.
*H04B 7/185* (2006.01)
*H04W 16/26* (2009.01)

(52) U.S. Cl.
CPC .................................. *H04W 16/26* (2013.01)

(58) Field of Classification Search
None
See application file for complete search history.

(56) References Cited

U.S. PATENT DOCUMENTS

| 6,665,521 | B1 | 12/2003 | Gorday et al. | |
|---|---|---|---|---|
| 8,089,939 | B1 * | 1/2012 | Mater et al. | 370/332 |
| 8,103,212 | B1 | 1/2012 | Pezeshkian et al. | |
| 8,427,383 | B1 * | 4/2013 | Pezeshkian et al. | 343/757 |
| 2006/0039333 | A1 * | 2/2006 | Pirzada et al. | 370/338 |
| 2006/0132643 | A1 | 6/2006 | Chang et al. | |

(Continued)

OTHER PUBLICATIONS

H. G. Nguyen, N. Pezeshkian, M. Raymond, A. Gupta, J. M. Spector; Autonomous Communication Relays for Tactical Robots; Proceedings of ICAR 2003, The 11th International Conference on Advanced Robotics Coimbra, Portugal, Jun. 30-Jul. 3, 2003.

(Continued)

*Primary Examiner* — Sulaiman Nooristany
(74) *Attorney, Agent, or Firm* — SPAWAR Systems Center Pacific; Kyle Eppele; J. Eric Anderson

(57) ABSTRACT

A method of maintaining an ad hoc communications network between a base and a mobile platform as the mobile platform moves over a surface comprising the following steps: providing a radio relay device; physically coupling a deployer to the mobile platform, wherein the deployer is configured to releasably stow the radio relay device; sending video data from the mobile platform to the base; monitoring the strength of a network signal received over time at the mobile platform and issuing a weak-link warning when the highest signal strength received at the mobile platform drops below a threshold value; calculating video throughput data metrics based on video data received at the base over time, and issuing an imminent link-failure alert when the metrics reach a predefined condition; and deploying the relay device from the deployer to the surface after the weak-link warning and the imminent link-failure alert are issued.

17 Claims, 19 Drawing Sheets

(56) References Cited

U.S. PATENT DOCUMENTS

2007/0002736 A1*  1/2007  Gade et al. .................... 370/230
2007/0180106 A1*  8/2007  Pirzada et al. ................ 709/224
2008/0101325 A1*  5/2008  Bao et al. ...................... 370/345
2011/0009053 A1   1/2011  Anglin et al.

OTHER PUBLICATIONS

Hoa G. Nguyen, Nathan Farrington, and Narek Pezeshkian; Maintaining Communication Link for Tactical Ground Robots; AUVSI Unmanned Systems North America 2005, Anaheim, CA, Aug. 3-5, 2004.

Pezeshkian, Neff, and Hart; Link Quality Estimator for a Mobile Robot; 9th Int. Conf. on Informatics in Control, Automation and Robotics (ICINCO 2012), Rome, Italy, Jul. 28-31, 2012.

Pezeshkian, N., Nguyen, Hoa G., Burmeister, Aaron, "Unmanned Ground Vehicle Radio Relay Deployment System for Non-Line-of-Sight Operations", 13th IASTED International Conference on Robotics and Applications, Wurzberg, Germany, Aug. 29-31, 2007.

Unpublished U.S. Appl. No. 11/832,065, filed Aug. 1, 2007, by Aaron Burmeister et al., titled "Wireless, Self-Contained Relay Device" (Navy Case 98480).

Sarnoff Corporation; Tactical Military Communications for Subterranean & Urban Environments (CSUE); available on the internet at: http://www.sarnoff.com/downloads/research-and-development/video-communications-networking/communications-networking/ad-hoc-networking/CSUE_military_ds.pdf; believed to have been posted on the internet on Nov. 10, 2007.

* cited by examiner

METHOD OF MAINTAINING AN AD HOC COMMUNICATIONS NETWORK BETWEEN A BASE AND A MOBILE PLATFORM

CROSS-REFERENCE TO RELATED APPLICATIONS

This application is a continuation in part of prior U.S. patent application Ser. No. 13/470,850, filed 14 May 2012 titled "System and Method for Remotely-Operated Deployment and Retrieval of Communication Relays" (Navy Case 101287), which claims priority from U.S. Provisional Application 61/617,183, filed 29 Mar. 2012 titled "System and Method for Remotely-Operated Deployment and Retrieval of Communication Relays"; this application is also a continuation in part of prior U.S. patent application Ser. No. 11/832,103, filed 1 Aug. 2007 titled "Relay Device Deployer System" (Navy Case 98795), which claims priority from U.S. Provisional Application 60/860,235, filed 8 Nov. 2006, titled "Communications Relay Brick and Deployer." patent application Ser. No. 11/832,103 is incorporated by reference herein in its entirety.

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice (619) 553-2778; email T2@spawar.navy.mil. Reference Navy Case Number 102533.

BACKGROUND OF THE INVENTION

Maintaining communications between a mobile platform and a base station in non-line-of-sight conditions can be problematic. Buildings, trees, hills, and other obstructions negatively reflect, distort, and/or absorb radio signals. A need exists for a method for preserving communications between a mobile platform and a base station.

BRIEF DESCRIPTION OF THE DRAWINGS

Throughout the several views, like elements are referenced using like references.

DETAILED DESCRIPTION OF EMBODIMENTS

Figure 1:
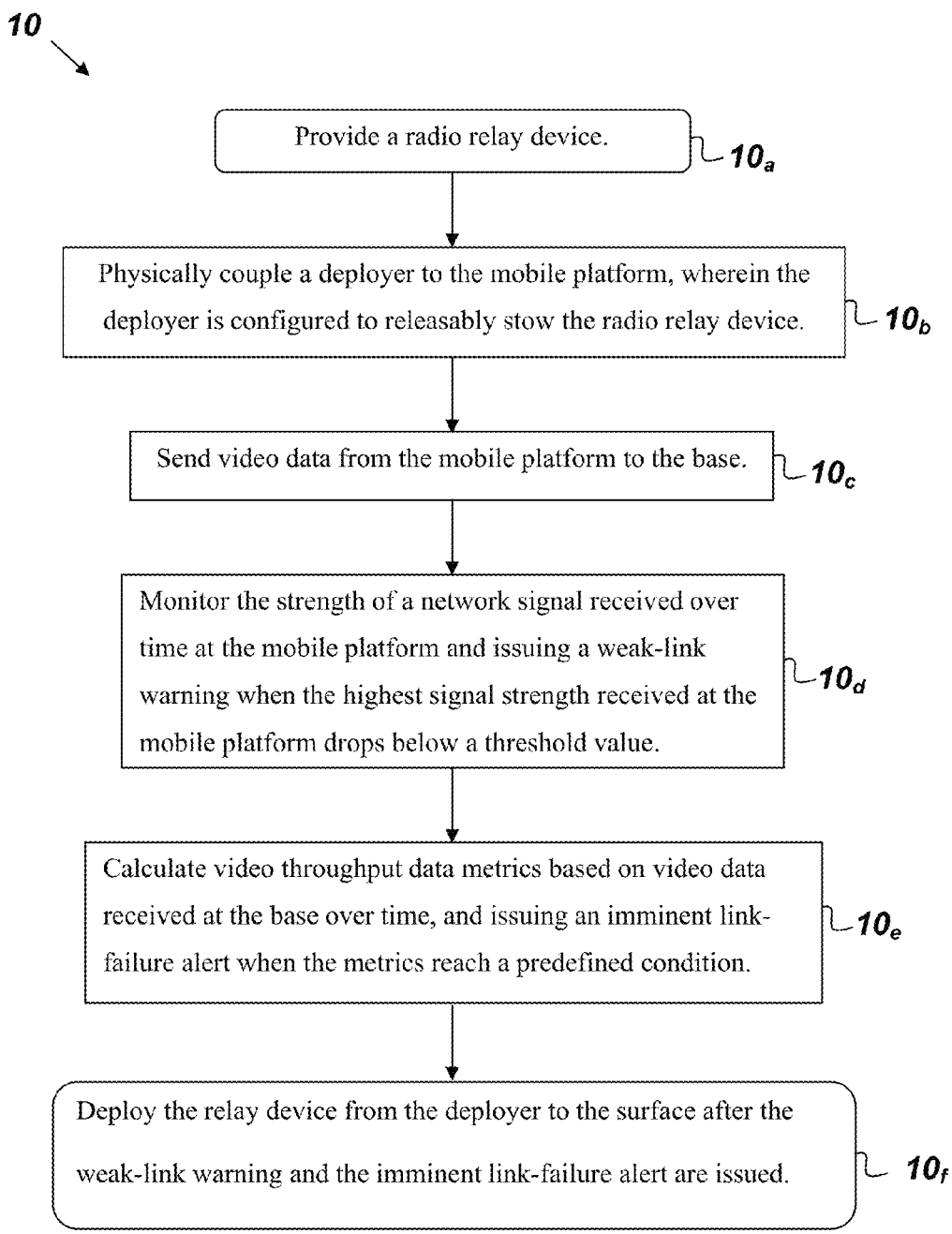
FIG. 1 is a flowchart of a method for maintaining an ad hoc communications network between a mobile platform and a base station.

FIG. 1 is a flowchart of a method 10 of maintaining an ad hoc communications network between a base and a mobile platform as the mobile platform moves over a surface. The first step $10_a$ provides a radio relay device. The next step $10_b$ provides for physically coupling a deployer to the mobile platform, wherein the deployer is configured to releasably stow the radio relay device. The next step $10_c$ provides for sending video data from the mobile platform to the base. The next step $10_d$ provides for monitoring the strength of a network signal received over time at the mobile platform and issuing a weak-link warning when the highest signal strength received at the mobile platform drops below a threshold value. The next step $10_e$ provides for calculating video throughput data metrics based on video data received at the base over time, and issuing an imminent link-failure alert when the metrics reach a predefined condition. The next step $10_f$ provides for deploying the relay device from the deployer to the surface after the weak-link warning and the imminent link-failure alert are issued.

Figure 2:
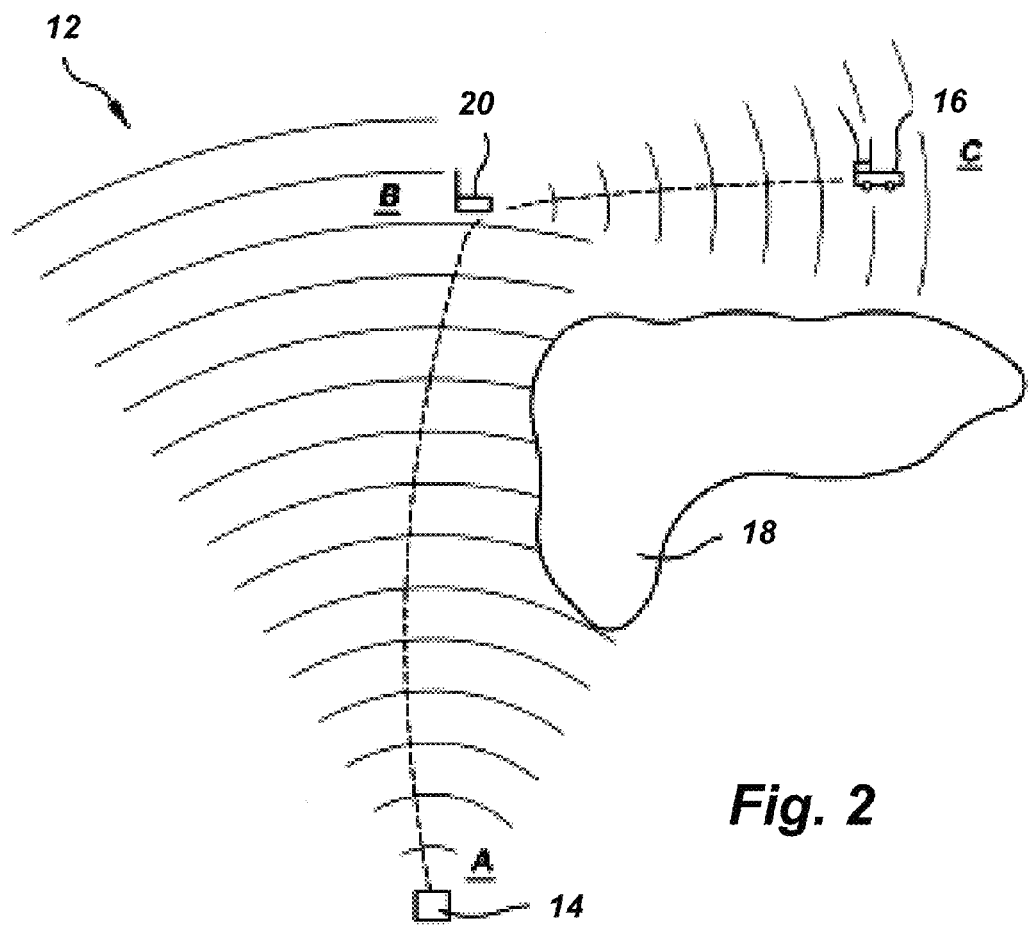
FIG. 2 shows an ad hoc telecommunications network being maintained between a base station and a mobile platform in the presence of an obstacle.

FIG. 2 is an illustration of an ad hoc telecommunications network 12 being maintained between a base station 14 and a mobile platform 16 in the presence of an obstacle 18. As the mobile platform 16 travels from position A towards position B, it experiences uninterrupted line of sight (LOS) communications with the base station 14. However, as the mobile platform 16 begins to travel from position B to position C, radio communications begin to be obstructed by obstacle 18.

Example embodiments of obstacle 18 include, but are not limited to buildings, trees, hills, or any other physical or nonphysical obstructions that negatively reflect, distort, and/or absorb radio signals. The base station 14 may be any stationary or mobile site capable of being a node in the network 12. For example, the base station 14 may be, but is not limited to, a vehicle-mounted control center, a man-portable control center, or a control center in a building. FIG. 2 shows how a relay device 20 may be placed in the vicinity of position B to allow the mobile platform 16 to continue around obstacle 18 towards position C without losing radio connectivity with the base station 14.

In order to provide non-LOS (NLOS) communications one may use intermediate relay nodes, such as the relay devices 20, that can maintain LOS with adjacent radio nodes in the network 12. For example, if the mobile platform 16 is traveling around a corner it will lose LOS with the base station 14 and cause the link to break. Adding a relay node at the corner will allow that node to maintain LOS with both the mobile platform 16 and base station 14, maintaining the link between the two. The radio in the mobile platform 16, base station 14, and the relay device 20 form the mesh network 12. Additional relay devices 20 can be added to such a network to increase the physical network size, providing greater coverage. Additional nodes may also provide alternate routing paths. For example, if a relay device 20 in the current routing path goes down for some reason and another path exists via another node in the network 12, the routing path will automatically switch and maintain the link between the mobile platform 16 and base station 14.

Figure 3:
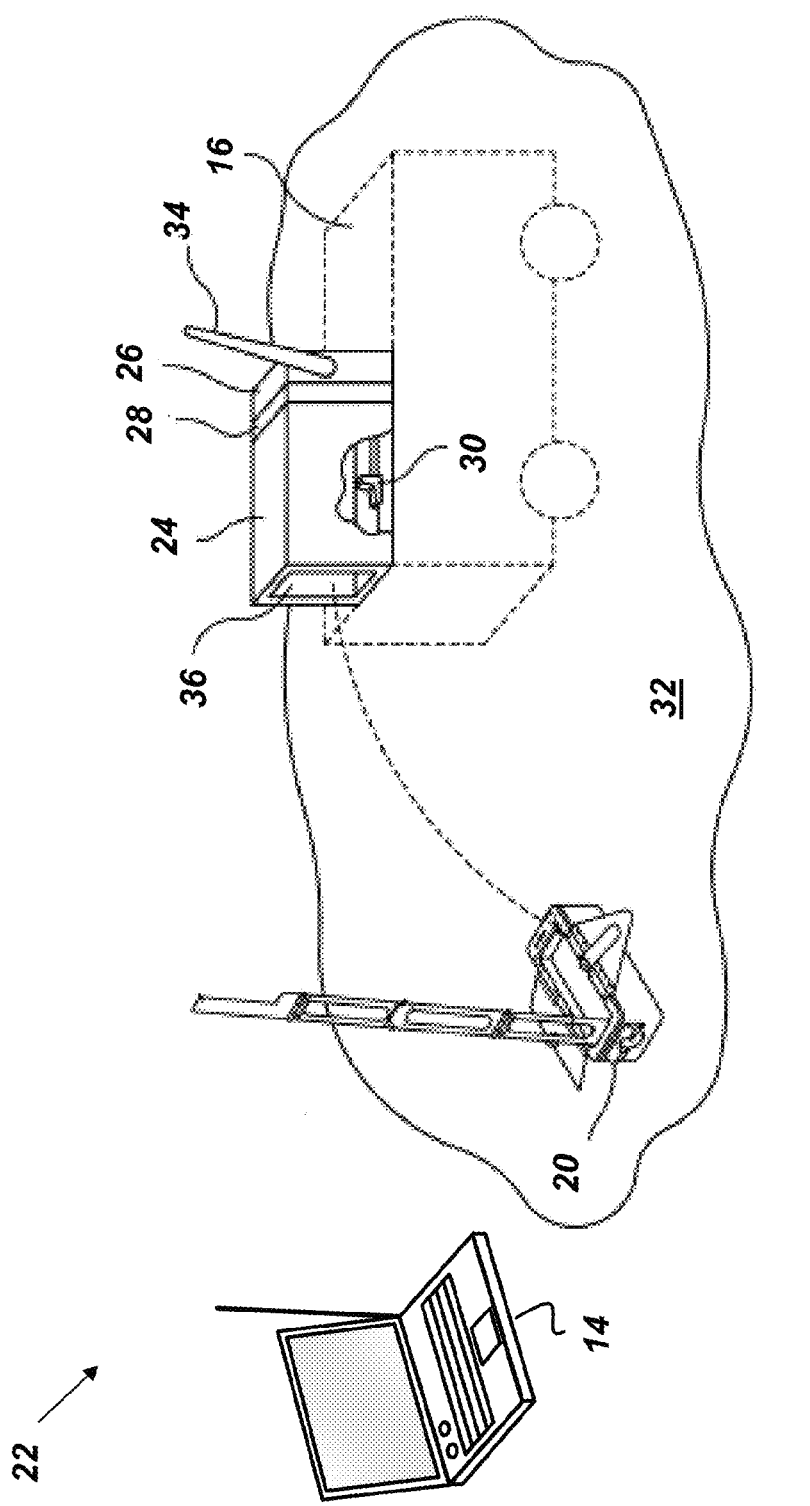
FIG. 3 shows an embodiment of a relay device deployment system for maintaining an ad hoc communications network between a mobile platform and a base station.

FIG. 3 shows an embodiment of a system 22 that may be used with method 10. System 22 comprises the mobile platform 16, the base station 14, at least one relay device 20, and a deployer 24. The deployer 24 is configured to be mounted on the mobile platform 16 and to stow the relay device 20. The deployer 24 comprises a radio 26, a processor 28, and a deployment mechanism 30. The radio 26 and the relay device 20 are each configured to operate as nodes in the network 12, as shown in FIG. 2. Upon receiving a command from the processor 28 or the base station 14, the deployment mechanism 30 is configured to deploy the relay device 20 to a surface 32 over which the mobile platform 16 is traveling. The processor 28 is operatively coupled to the radio 26 and to the deployment mechanism 30.

The support surface 32 may be the ground, the floor of a building, the surface of the water, or any other surface capable of supporting the mobile platform 16 and the relay device 20. The deployer 24 may be any size or shape capable of stowing a relay device 20 and of being mounted on the mobile platform 16. The deployer 24 may be mounted to any surface of the mobile platform 16, top, bottom, front, back, or sides. The mobile platform 16 may be any land or water-surface-based platform capable of locomotion. Examples of the mobile platform 16 include, but are not limited to the following: a human; an animal; land-based vehicles, both manned and unmanned (autonomous & radio-controlled); and water craft, both manned and unmanned (autonomous & radio-controlled). Also shown in FIG. 3 is a deployer antenna 34, operatively coupled to the radio 26, and a relay bay 36 configured for stowing the relay device 20. The radio 26 may be any radio capable of operating as a node in an ad hoc telecommunications network 12. An example of the radio 26 is a PC Card 802.11b radio and a small single-board computer (such as Bright Star Engineering's™ nanoEngine™, utilizing Intel's® StrongARM™ processor) both coupled to a radio interconnect board. FIG. 3 shows the deployment mechanism 30 as a spring-loaded launcher, but it is to be understood that the deployment mechanism 30 may be any mechanism capable of deploying the relay device 20 from the deployer 24 to the support surface 32. The processor 28 may be any processor that is capable of monitoring a received signal strength indicator (RSSI) in the network 12.

The mobile platform 16 can carry a plurality of intermediate relay radios 20 and deploy them when and where needed to maintain the link with the base station 14. In most operational environments, the precise placement location for each relay 20 is not known ahead of time. Knowing where to place each relay device 20 in an unknown environment is challenging. Therefore, the decision regarding the time and location of deployment of a relay device 20 must frequently be formulated onsite and a given relay device 20 must be deployed before the link with the base station 14 breaks. The number of relay devices 20 carried by the mobile platform 16 is limited. Increasing the distance between the relay devices 20 translates into increased stand-off distance between the base station 14 and the mobile platform 16, which may be desirable in many operating environments. Method 10 utilizes a link-quality estimator based on video throughput and received signal strength data to accurately identify the appropriate time to deploy a relay device 20. One of the steps of method 10 may involve issuing an alert that can be used as a trigger for an automatic relay deployment mechanism or to advise an operator to manually deploy relay devices 20 before the link between the mobile platform 16 and the base station 14 fails. The estimator may be trained to take into account human perception of video quality that is obtained via subjective testing by a human operator.

Referring back to FIG. 1, steps $10_d$ and $10_e$ may be collectively referred to as a link quality (LQ) estimator. The LQ estimator may use RSSI data for step $10_d$ and user datagram protocol (UDP) throughput data in packets per second for step $10_e$. The throughput data is a direct indicator of video quality—one of the factors considered in the deployment decision-making process by a human operator. Video quality, however, is subjective. A slightly choppy video may be perceived as acceptable to one human operator and unacceptable to another. To quantify video quality, experimental data was gathered as human operators monitored video data sent from the mobile platform 16 over time as it traveled along a predetermined path away from the base station 14. When the video quality, as judged by the human operators, began to degrade, each operator marked that point in time. When the link was completely lost, each operator marked that point in time as well. These two moments in time are $t_F$ (failing) and $t_L$, (lost), respectively. The link-failure period ($t_{LF}$) is simply $t_L$-$t_F$.

Figure 4A:
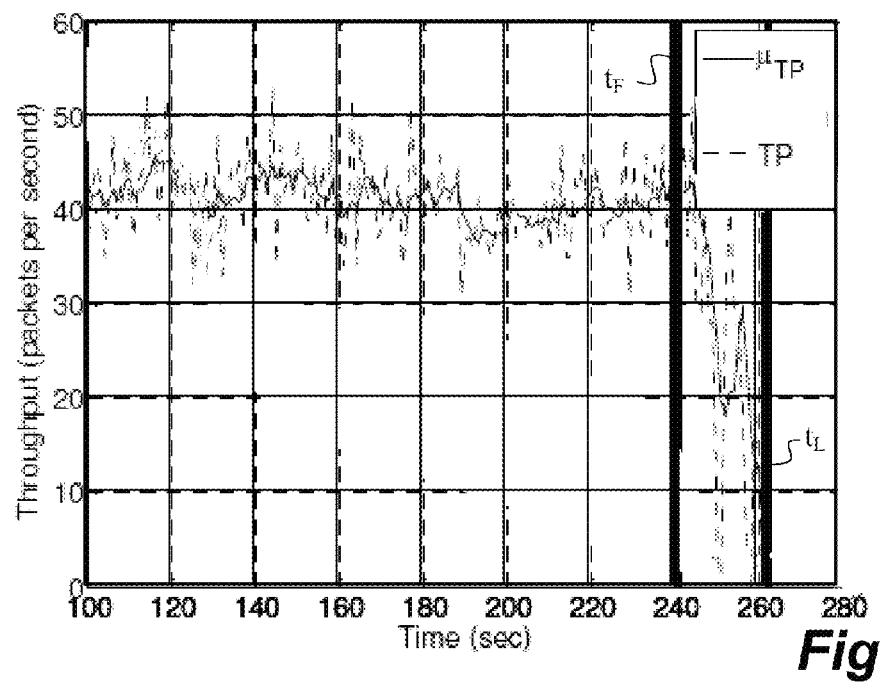
FIG. 4A is a plot of video throughput data over time.
Figure 4B:
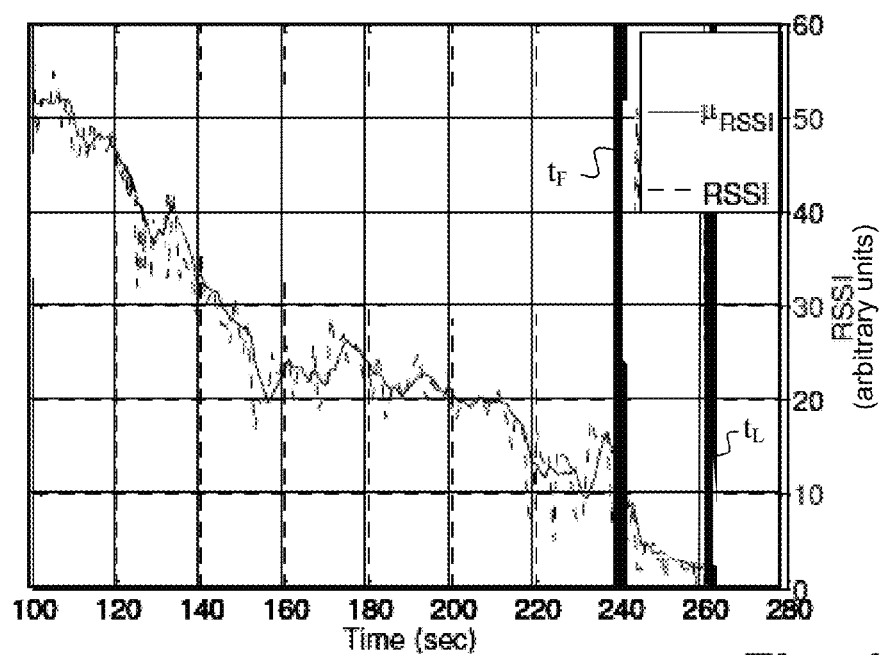
FIG. 4B is a plot of received signal strength indicator over time.

FIGS. 4A and 4B are plots of a sample of collected data showing link failing and link lost times for a particular mobile platform 14. A simple moving average process was applied to all data in FIGS. 4A-4B to smooth out variations. FIG. 4A is a plot of video throughput data received at the base station 14 over time from a mobile platform 14 as the mobile platform 14 distances itself from the base station 14. The solid trace is the average ($\mu_{TP}$) of the past five samples of underlying throughput (TP) data (represented by the dotted trace). FIG. 4B is a plot of RSSI data of the network 12 between the mobile platform 16 and the base station 14 over time as the mobile platform 14 distances itself from the base station 14. The solid trace in FIG. 4B is the average ($\mu_{RSSI}$) of the past five samples of underlying RSSI data (represented by the dotted trace). For both FIGS. 4A and 4B, the left and right black lines represent $t_F$ and $t_L$ respectively. Many such trial runs were performed under different environments. In all test trials, trends were discovered in the throughput data during $t_{LF}$, summarized as follows: 1) The throughput begins to roll off sometimes gradually and sometimes relatively sharply, and 2) the throughput variance increases. The RSSI data, as expected, drops gradually overtime as the mobile platform 16 moves away from the base station 14. Before $t_F$, however, the throughput data does not show any clear trend. The test trials for one embodiment of the platform 14 show that $t_{LF}$ varies between 10 to 20 seconds, which provides ample time to issue an alert. These trends are exploited by method 10.

RSSI data is measured at the lowest transmission rate and, alone, is less effective as a link quality estimator at high transmission rates. Furthermore, RSSI is only measured from the packet preamble; therefore, if an interfering signal happens to prevent proper reception of the preamble, the RSSI will simply not be recorded. If the interfering signal happens to corrupt the packet after the preamble has been received, then the RSSI will be recorded as if there is no interference. Hence, RSSI data is unchanged even in the presence of interference. Broadband noise, however, is a concern. If the overall noise floor is raised due to external broadband sources of noise, the overall signal to noise ratio of received packets will decrease. This means that RSSI data can only be measured down to the raised noise floor since packets received below the noise level will be corrupted. Looking at FIG. 4B, it may seem reasonable to threshold the RSSI at about 10, below which the throughput data enters the region of degraded video quality, $t_{LF}$. This approach may work in the absence of broadband noise, but that constraint cannot be guaranteed when operating in a variety of environments. The LQ estimator of method 10 predicts link failures so that a relay device 20 can be deployed before the link breaks. Preferably, some early warning should be given to the operator by the relaying system, followed by an imminent failure alert so that a relay device 20 may be deployed before the link breaks. Broadband noise, however, can exist. Given the limitations of RSSI, method 10 uses RSSI data only to generate a conservative early warning.

Figure 5:
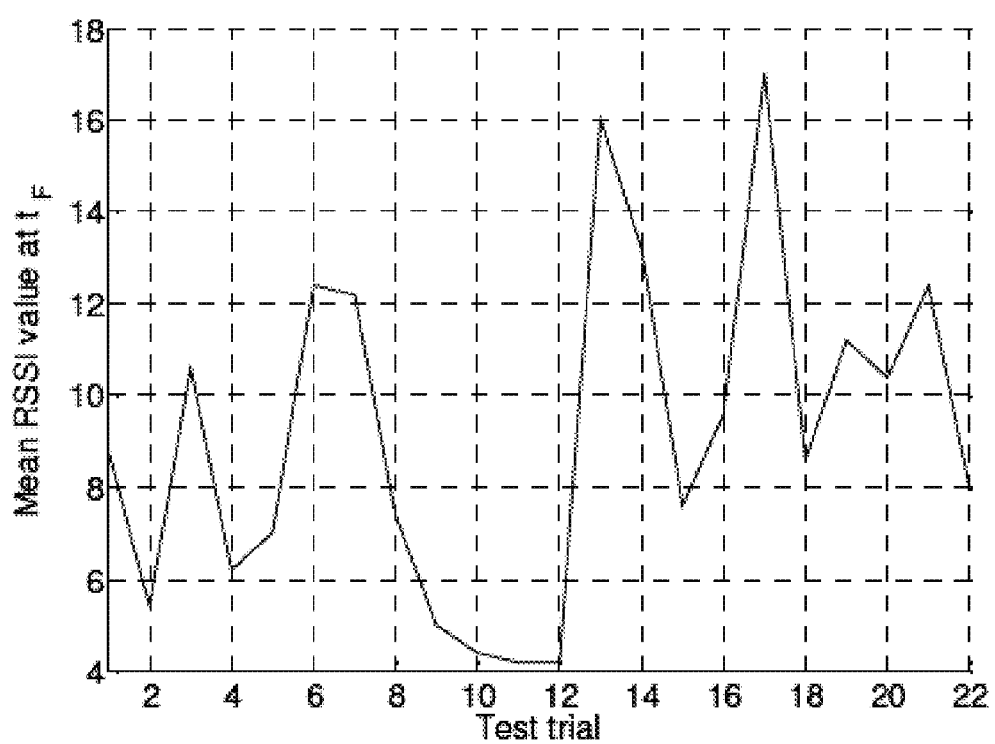
FIG. 5 is a plot of mean received signal strength indicator values over several test trials.

FIG. 5 is a plot showing the mean RSSI value at time $t_F$, for a plurality of test trials. There are clear variations but the overall range is low (i.e., below 18). A conservative early warning of link failure may be issued, for example, if the mean RSSI drops below a threshold of 20 units. Selecting a high threshold leaves quite a bit of margin should the noise floor increase due to broadband noise.

An accurate estimation of imminent link failure is required to alert the operator of complete loss of connectivity or to trigger the automatic deployment of a relay device 20 from the mobile platform 16. Since RSSI data does not accurately reflect the ability of a link to successfully deliver packets as discussed above, the LQ estimator of method 10 uses video throughput data in addition to RSSI data to accurately assess the quality of the link between the mobile platform 16 and the base station 14. In one embodiment of method 10, in addition to the RSSI data, the LQ estimator considers two metrics, referred to as the K-factor and the vector x, both of which are based on the video throughput data.

The K-factor is based on the observation that, during $t_{LF}$, the variance $\sigma$ of the throughput data increases and the mean $\mu$ drops. Since the mean $\mu$ is high and variance $\sigma$ low prior to $t_F$ and vice versa during $t_{LF}$, method 10 uses the ratio of the two (i.e., $\kappa=\mu/\sigma$) as the K-factor. The K-factor may be used as a measure of network 12 signal fading.

The vector x is based on the video throughput data roll off. The roll off may be measured by first taking N samples of throughput data then calculating its intercept ($x_1$) and slope ($x_2$) using linear regression. The assumption is that the N-sample-long data is a straight line. Using a sliding window, $x_1$ and $x_2$ are updated for each new sample. The vector x is defined as follows: vector $x=[x_1\ x_2]$. The trade-off between the false-alarm rate and the miss rate is dependent on N. Low false-alarm and low miss rates are desired. By setting N too high, the data will be too smooth and the LQ estimator slow to respond. This has the effect of reducing the false-alarm rate due to reduced noise, but increases the miss rate due to reduced response time. In effect, the link is lost before the LQ estimator has a chance to issue an alert. On the other hand, setting N too low causes the data to be too noisy, increasing the false-alarm rate, but reducing the miss rate due to increased response time. Since the cost of failing to issue an alert (a miss) is much greater than alerting too soon (a false alarm), it is desirable to bias the selection of N towards reducing the miss-rate, for example by choosing N=5.

Figure 6A:
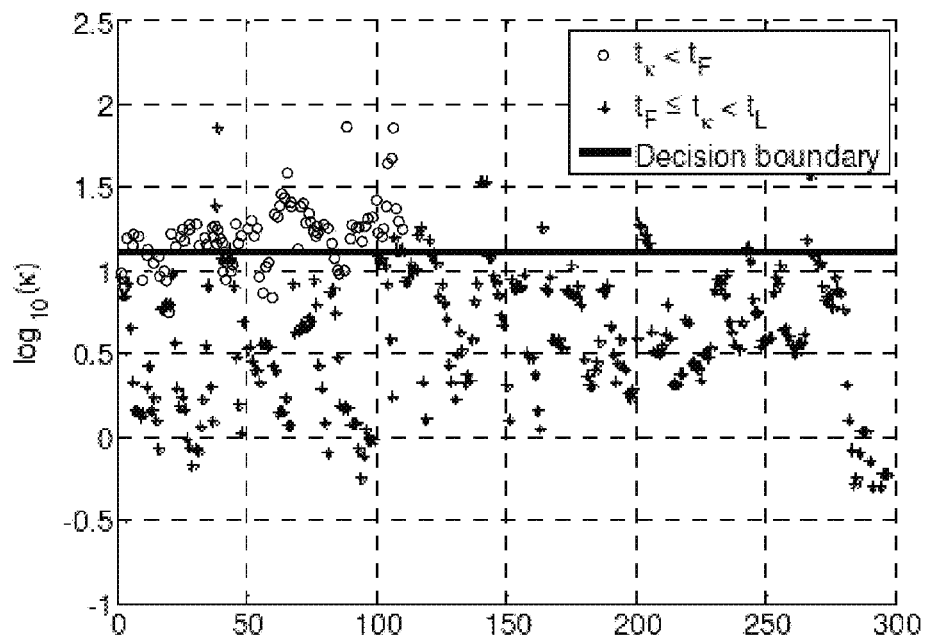
FIG. 6A is a plot of labeled κ values for several test trials.

FIG. 6A is a plot of labeled $\kappa$ values for all test trials. The circles represent instances where $t_\kappa<t_F$. The asterisks are data that take place during $t_{LF}$. In other words, the asterisks represent instances where $t_F \leq t_\kappa < t_L$. The solid line represents the decision boundary. The K-factor's log was taken to improve computation of the boundary.

Figure 6B:
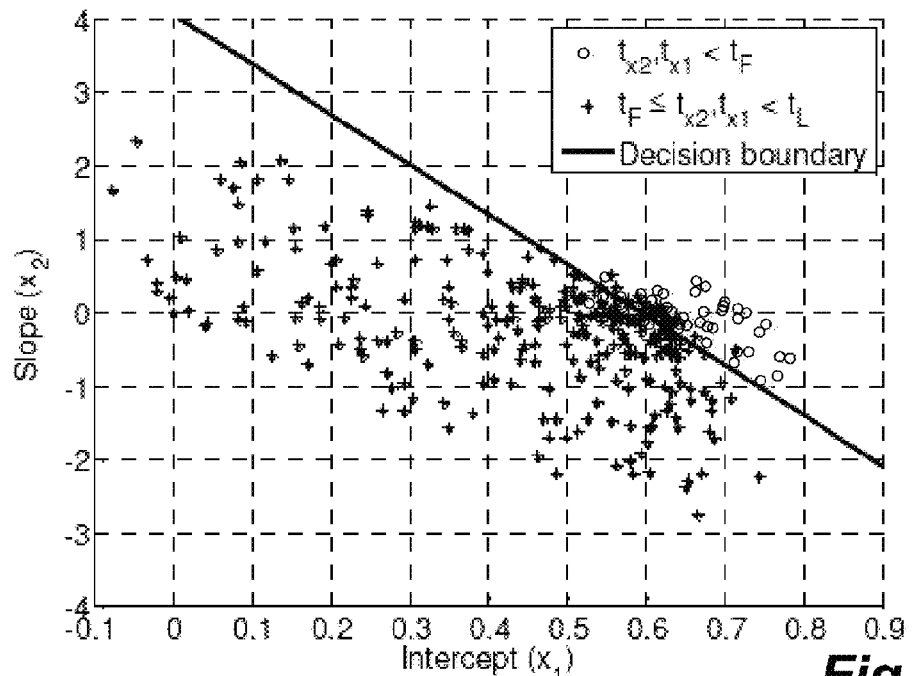
FIG. 6B is a plot of the intercept versus the slope of a collection of data.

FIG. 6B is a plot of the intercept ($x_1$) versus the slope ($x_2$). The circles represent instances where $t_2, t_{x1}<t_F$. The asterisks are data that take place during $t_{LF}$. In other words, the asterisks represent instances where $t_F \leq t_{x2}, t_{x1} < t_L$. The solid line represents the decision boundary. In FIG. 6B, both variables (i.e., $x_1$ and $x_2$) have been scaled to reduce their range for improved computation of the decision boundary.

Time data, such as $t_F$ and $t_L$, received through experimentation with human operators may be used to train the LQ estimator. For example, half of the collected data may be used as training data and the other half as test data. A labeling problem can be solved by classifiers. Supervised training may be used by two classifiers, one for the K-factor and the other for vector x. Each classifier finds the optimal decision boundary between two different sets of labeled data: those marked before $t_F$ (signal OK) and those marked during $t_{LF}$ (signal failing). The hypothesis function for the K-factor is given by $z_\kappa(\theta_\kappa)=\theta_0+\theta_1\kappa$ and for vector x the hypothesis function is $z_x(\theta_x)=\theta_0+\theta_1 x_1+\theta_2 x_2$. Both are modeled as linear functions, which is a reasonable assumption when looking at the data clusters in FIGS. 6A and 6B. The optimal parameter vector $\theta$ is found by the classifier, which defines the decision boundary that has values $z(\theta)\geq 0$ on one side and $z(\theta)<0$ on the other.

The plot of labeled $\kappa$ values for a plurality of test trials is shown in FIG. 6A. The plot of labeled $x_1$ and $x_2$ values for a plurality of test trials is shown in FIG. 6B. Using logistic regression, an optimal decision boundary is generated, shown as the solid line in both FIGS. 6A and 6B. All the circles above the boundary line are hits (i.e., instances where both the LQ estimator and the test data show that the data link is OK) and those below the line are false alarms (i.e., where the LQ estimator shows the link as failing when in fact it is not). All asterisks below the line are hits (i.e., where the LQ estimator shows the link failing when it is in fact failing) and those above the line are misses (i.e., where the link is actually failing but no alert is issued by the LQ estimator). In both figures there is overlap between the labeled data. Given the high cost of misses, the decision boundary may be biased so as to reduce the number of misses.

FIG. 6B supports the roll-off trend of the throughput data. Looking at FIG. 4A, the flat part of the throughput data roughly corresponds to 40 packets-per-second and since it is flat its slope is about zero. This correlates to the circle cluster seen in FIG. 6B. As the throughput begins to fail during $t_{LF}$, the packet rate drops, which corresponds to the reduced $x_1$ (intercept) values. At the same time the slope increases in the negative direction. This corresponds to the asterisk cluster in FIG. 6B. The positive $x_2$ values are due to the variance of the throughput data during $t_{LF}$ that can cause the slope to go positive momentarily. Notice, however, very few occurrences of positive slope and high intercept values take place. The occurrences of high intercept and high negative slope can be explained by sharp roll-offs, where the throughput value is still somewhat high but the slope is steep.

The LQ estimator may be configured to provide an early warning of link failure (based on RSSI data) and a more accurate imminent link-failure alert (based on LQ metrics calculated from throughput data). These metrics are somewhat noisy due to the selection of N chosen to increase responsiveness (reduced miss rate), and hence, sensitivity (increased false-alarm rate). Each metric alone is not sufficient to provide an accurate estimation, therefore they are combined. The manner in which they are combined is essentially an AND operation between the hypothesis functions. This implies that both hypothesis functions $z_\kappa(\theta_\kappa)$ and $z_x(\theta_x)$ should agree that the link is failing, which occurs when both $z_\kappa(\theta_\kappa)$ and $z_x(\theta_x)$ are less than zero. Furthermore, the LQ estimator may be configured so as to not issue an alert unless both $z_\kappa(\theta_\kappa)$ and $z_x(\theta_x)$ are less than zero for three consecutive samples in a row. This eliminates momentary glitches where both hypothesis functions are below zero. Finally, the LQ estimator may be configured so as to not start calculating the imminent link-failure alert until a warning is issued due to the mean RSSI data falling below a conservative threshold.

Figure 7:
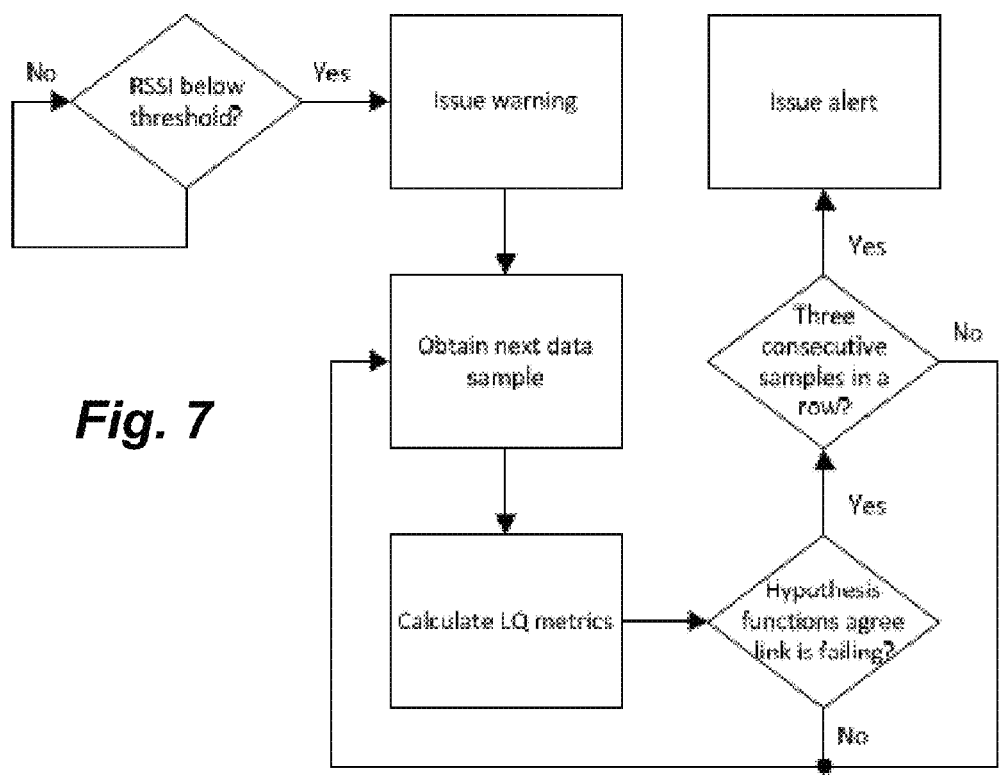
FIG. 7 shows a simplified flow chart for an example embodiment of a link quality estimator.

FIG. 7 shows a simplified flow chart for an example embodiment of the LQ estimator. The flow chart does not show the additional steps that may be taken to deactivate the warning and alert indicators. For example, instead of using a single threshold, hysteresis can be added to the mean RSSI data where falling below the lower threshold (e.g., mobile platform 16 moving away from base station 14) causes a warning to be issued, which is removed when the mean RSSI moves above the upper threshold (e.g., mobile platform 16 moving back towards base station 14). In a somewhat similar manner the link-failure alert indicator can be removed. For example, an issued alert can be removed if both hypothesis functions agree that the signal is good, say for five consecutive samples.

Figure 8:
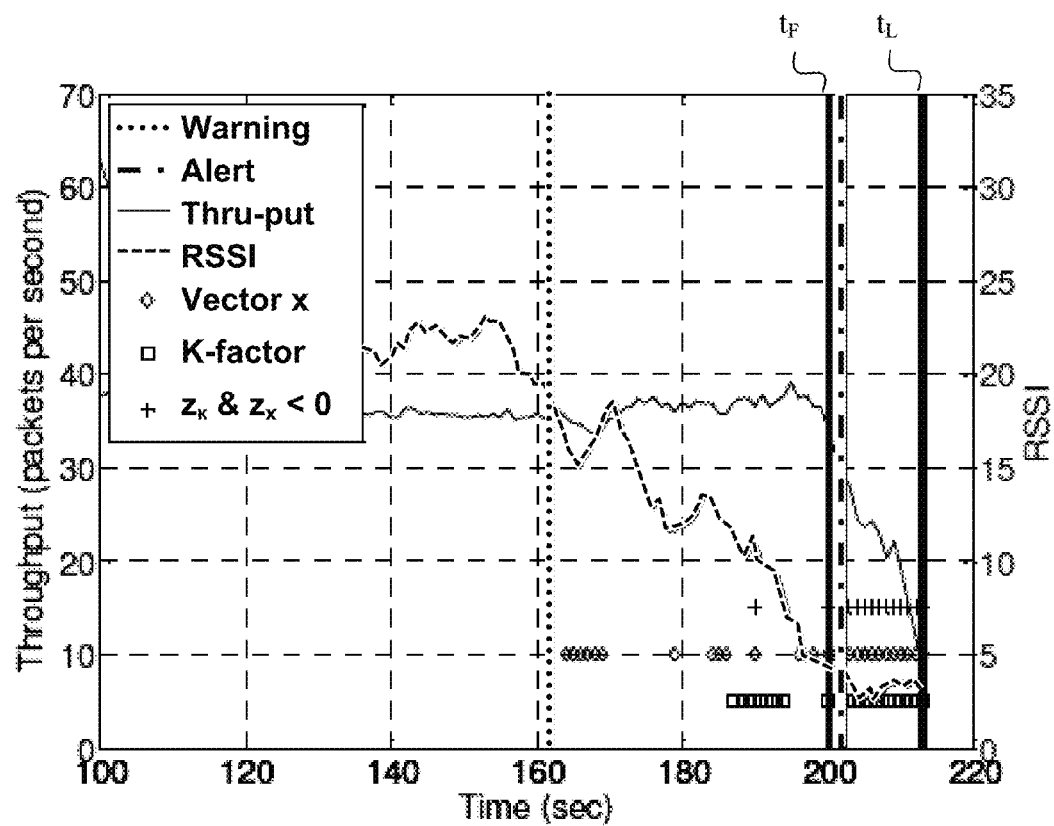
FIG. 8 is a sample plot of video throughput and RSSI data over time.

FIG. 8 shows a sample plot of video throughput and RSSI data of a test trial over time. The plot shows that a warning is issued when the mean RSSI falls below 21 (hysteresis enabled). The time at which the weak-link warning is issued is represented by the round-dotted line. The time at with the imminent-link-failure alert is issued is represented by the dash-dot line. The throughput data is represented by the solid trace. The RSSI data is represented by the short-dashed line. Once the weak-link warning has been issued, the LQ estimator begins calculating the LQ metrics and testing the hypothesis functions $z_\kappa(\theta_\kappa)$ and $z_x(\theta_x)$. A value of less than zero indicates a hit, which is shown in FIG. 8 as a small square for K-factor values and a small diamond for Vector x values. The plus '+' signs represent instances when both functions (i.e., $z_\kappa(\theta_\kappa)$ and $z_x(\theta_x)$) are less than zero at the same time, which instances may be referred to as link-failure hits. For example, a link-failure hit takes place around 190 seconds, as shown in FIG. 8. In the embodiment of method 10 corresponding to FIG. 8, the LQ estimator only issues an alert (dash-dot line) after three consecutive link-failure hits (e.g., time $t_A$=202). In FIG. 8, time $t_A$ occurs just after $t_F$=200, which leaves time to deploy a relay device 20 before the link is completely lost at time $t_L$=213.

The LQ estimator will occasionally issue an alert prior to $t_F$ due to the overlap in the training data as shown in FIGS. 6A-6B. This is a desirable effect because the alert is issued just before video degradation begins. An alert issued after $t_F$ is also acceptable so long as the alert does not take place too close to $t_L$, which may not provide enough time to deploy a relay device 20 before the link breaks. Therefore, the accuracy of the LQ estimator is defined as the percentage of alerts issued within a specified window of time $t_w$ centered on $t_F$ for all test data. The window $t_w$ is defined as $t_F \pm \Delta t$. The value $\Delta t$ is equal to $\beta t_{LF}$ where $0 < \beta \leq 1$. This ensures that $\Delta t$ is no greater than $t_{LF}$. The selection of $\beta$ is somewhat arbitrary. The smaller $\beta$ is, the closer the alert issue time $t_A$ must be to $t_F$ before the alert is counted as an accurate hit. Table 1 shows the accuracy result for different values of $\beta$.

TABLE 1

| β | Hit % | False Alarm % | Miss % |
|---|---|---|---|
| ½ | 73 | 9 | 18 |
| ⅔ | 82 | 9 | 9 |
| ¾ | 91 | 0 | 9 |
| 1 | 100 | 0 | 0 |

Table 1 shows that with $\beta=1$ all alerts are issued within $t_F \pm t_{LF}$, and 73% of alerts are issued within $t_F \pm t_{LF}/2$ with $\beta=\frac{1}{2}$.

The LQ estimator of method 10 provides an accurate means of estimating an imminent link failure. Since the mobile platform 16 carries a limited number of relay devices 20, increasing the distance between deployment locations will increase the communication range between the base station 14 and the mobile platform 16. The LQ estimator may be configured to issue two alerts: 1) a warning alert to the operator based on RSSI data, which serves as a conservative estimate of a link beginning to fail, and 2) a much more accurate link-failure alert based on throughput data when an imminent link failure is detected. The results from the test data show that the LQ estimator achieves high accuracy in issuing an alert before the link is completely lost.

Figure 9:
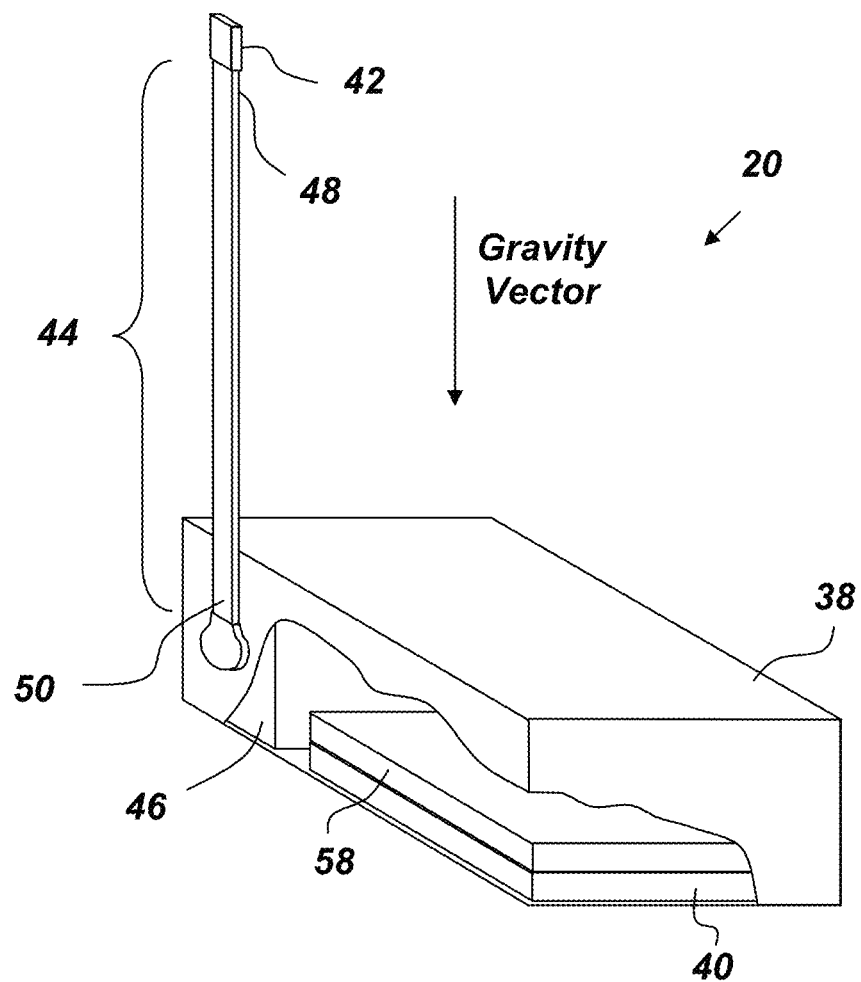
FIG. 9 is a perspective view of an embodiment of a relay device.

FIG. 9 is a perspective view of an embodiment of a system 22 that may be used with method 10. In this embodiment, the relay device 20 comprises a housing 38, a relay radio 40 mounted within the housing 38, a first antenna element 42, a first antenna mast 44, and an antenna mast rotation mechanism 46. The relay radio 40 and the rotation mechanism 46 are mounted within the housing 38. The first antenna mast 44 has a distal end 48, and a proximal end 50. The first antenna element 42 is operatively coupled to the relay radio 40 and mechanically coupled to the distal end 48 of the first antenna mast 44. The proximal end 50 of the first antenna mast 44 is rotatably coupled to the housing 38 and the rotation mechanism 46 such that the antenna mast rotation mechanism 46 is configured to upwardly rotate the first antenna mast 44 to a raised position such that the first antenna mast 44 is substantially parallel to the ambient gravity vector.

Figure 10:
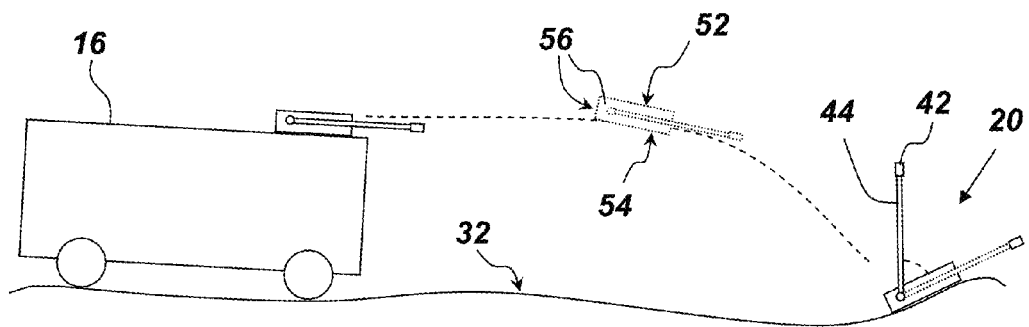
FIG. 10 is side view illustration of an embodiment of a relay device deployment system for maintaining an ad hoc communications network between a mobile platform and a base station.

FIG. 10 illustrates how the housing 38 of the relay device 20 shown in FIG. 9 may be configured to be released from the mobile platform 16 onto the support surface 32. The housing 38 may be transferred from the mobile platform 16 to the support surface 32 in any conceivable way. For example, the housing 38 may be ejected, dropped, placed, or embedded onto the support surface 32. As shown in FIG. 10, the housing 38 may comprise an upper surface 52, a lower surface 54, and at least one side 56. It is to be understood that while FIGS. 9 and 10 depict the housing 38 as a rectangular prism, the housing 38 may be any desired size or shape that is capable of containing the relay radio 40 and the antenna mast rotation mechanism 46. After being deployed from the mobile platform 16, the relay device 20 may bounce, roll, and or rock on the support surface 32 before it comes to rest. The relay device 20 may be constructed such that the housing 38 comes to rest on the upper surface 52 or the lower surface 54 after being deployed from the mobile platform 16. For example, in the embodiment shown in FIG. 2, the upper and lower surfaces 52 and 54 respectively are larger than the sides 56, making it more likely that the housing 38 will come to rest on either the upper surface 52 or the lower surface 54. In another example, the housing 38 may be weighted so as to allow the relay device 20 to come to rest on a desired surface. Any other means or configuration may be employed to cause the housing 38 to come to rest in a particular orientation on the support surface 32.

FIG. 10 also shows that the first antenna mast 44 is rotatably coupled to the side 56 in such a way as to allow the antenna 44 to be upwardly rotated once the housing 38 comes to rest on the support surface 32. No matter how the housing 38 is oriented after coming to rest on the support surface 32, the relay device 20 may be configured to upwardly rotate the antenna mast 44 until the antenna mast 44 is substantially parallel with the ambient gravitational field vector. As shown in FIG. 10, the support surface 32 need not be level.

Referring back to FIG. 9, the relay device 20 may optionally comprise a three-axis accelerometer 58 mounted within the housing 38 and operatively coupled to the antenna mast rotation mechanism 46. The three-axis accelerometer 58 may be used to determine proper antenna mast 44 alignment and to detect vibrations in the support surface 32. Depending on which way the relay device 20 lands, the antenna mast rotation mechanism 46 rotates the first antenna mast 44 so that the antenna mast 44 is raised to the nearly optimal position above the support surface 32 as determined by the relay device 20 through the use of the three-axis accelerometer 58.

Figure 11A:
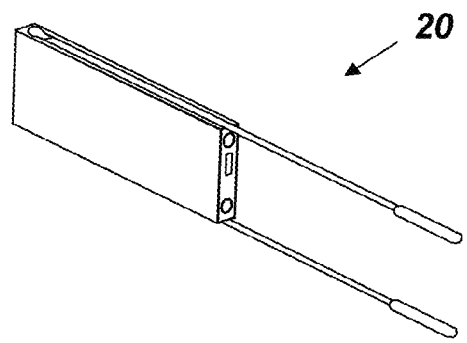
FIG. 11A is a perspective view of a relay device in a stowed configuration.
Figure 11B:
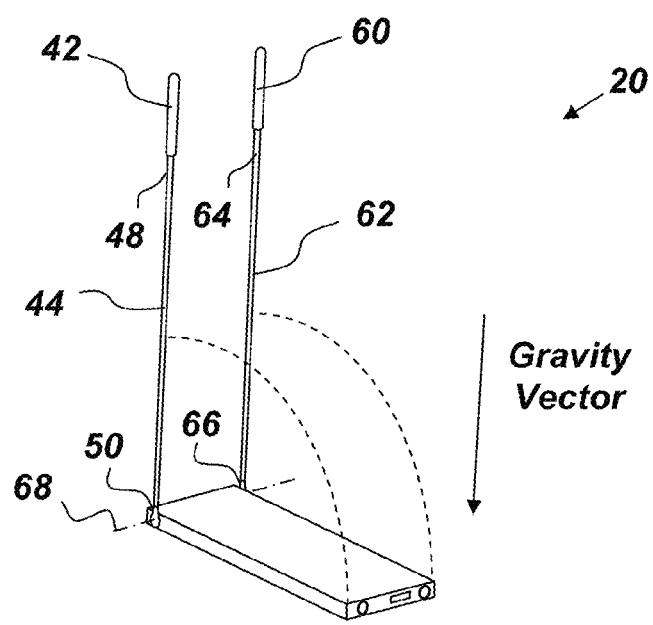
FIG. 11B is a perspective view of a relay device in a deployed configuration.

FIGS. 11A and 11B show perspective views of an embodiment of the relay device 20 further comprising a second antenna element 60 coupled to a second antenna mast 62. The second antenna mast 62 comprises a distal end 64 and a proximal end 66. FIG. 11A shows the relay device 20 in a stowed position. FIG. 11B shows the relay device 20 with first and second antenna masts 44 and 62 rotated into a position that is substantially parallel with the ambient gravity vector. The embodiment of the relay device 20 shown in FIGS. 11A and 11B, supports diversity antenna connection. This is accomplished by employing the first and second antenna masts 44 and 62, which are mechanically linked to the antenna mast rotation mechanism 46 (shown in FIG. 9). The first and second antenna elements 42 and 60 are coupled to the distal ends 48 and 64 of the first and second antenna masts 44 and 62 respectively. In operation, the antenna masts 44 and 62 may be hollow so as to allow RF coaxial cables, one from each of the first and second antenna elements 42 and 60, to pass through the antenna masts 44 and 62, ending in a right-angel RF connector (not shown) at the proximal ends 50 and 66. The right-angle RF connectors on the proximal ends 50 and 66 may be plugged into and securely mounted to an external interface of the antenna mast rotation mechanism 46 (not shown). This external interface allows the first and second antenna elements 42 and 60 to connect to the onboard relay radio 40 inside the housing 38 via a series of RF connectors and cables.

The antenna mast rotation mechanism 46 is capable of raising the two masts 44 and 62. The two antenna masts 44 and 62 may be physically linked together. In one example embodiment, the antenna mast rotation mechanism 46 employs an electronically controlled servo motor. The servo motor in this example is linked to the two masts 44 and 62 by a gear reduction system. This arrangement provides a single degree of freedom (DOF) for the rotation of the antenna masts 44 and 62 about a rotational axis 68. Once the antenna mast rotation mechanism 46 has positioned the first and second antenna masts 44 and 62 to be substantially parallel to the ambient gravity vector an antenna friction brake may be used to hold the first and second antenna masts 44 and 62 in position. In one example embodiment, the antenna friction brake may comprise an elastic member in frictional contact with a shaft connecting the first and second antenna masts 44 and 62. The strength with which the antenna friction brake holds the two masts 44 and 62 may be varied by adjusting the elasticity of the elastic member or varying the number of elastic members.

Figure 12:
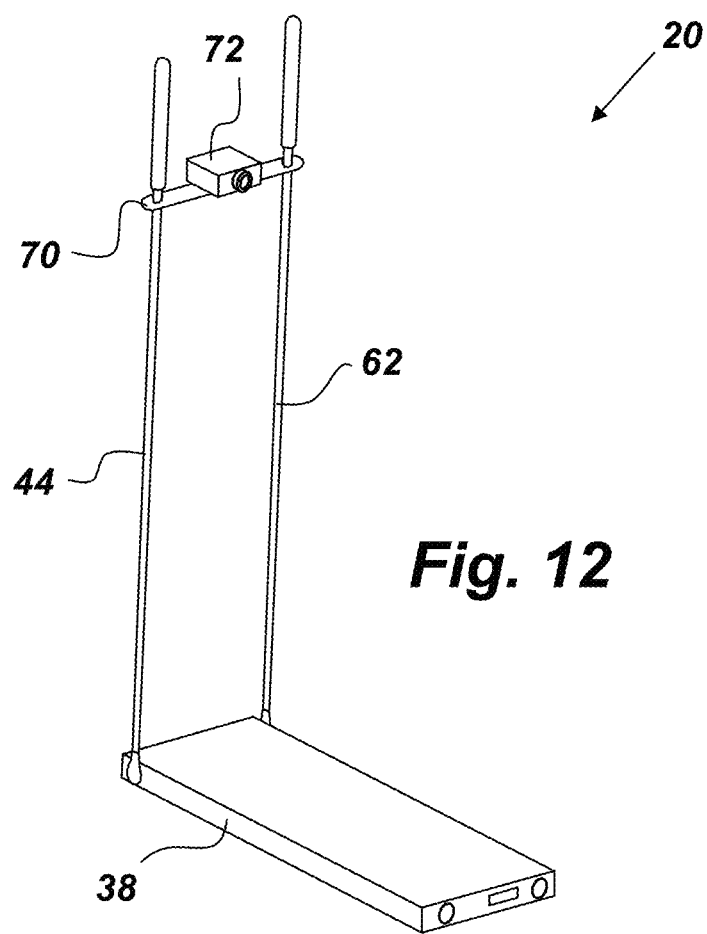
FIG. 12 is a perspective view of an embodiment of a relay device.

FIG. 12 shows another embodiment of the relay device 20 with an optional cross bar 70 mounted between the distal ends 48 and 64. The cross bar 70 contributes to antenna strength and allows the relay device 20 to be more easily retrieved. In addition, the first and second antenna masts 44 and 62 can optionally be used to support a sensor 72, which can be placed above the support surface 32 for improved operation. The sensor 72 may be any sensor capable of sensing a desired aspect of the environment. For example, the sensor 72 may be a video camera mounted on the crossbar 46 with cabling running down the hollow first and second antenna masts 44 and 62 and into the relay radio 40—thus enabling the relay device 20 to not only relay wireless data but also a video stream. Multiple relay devices 20 equipped with video cameras can provide video from various vantage points as desired.

The relay device 20 may be configured to be stored on the mobile platform 16 with the antenna masts 44 and 62 in positions that are parallel to the length of the housing 38, as shown in FIG. 11A. Due to the shape of the housing 38, once the relay device 20 is deployed from the mobile platform 16, it will either land on its upper surface 52 or lower surface 54. Once the relay device 20 comes to rest on the support surface 32, the three-axis accelerometer 58 measures the components of the gravity vector along each of its three axes. Using these components a mast rotation angle is determined such that when rotated to this angle the antenna masts 44 and 62 will be substantially parallel to the gravity vector. Position feedback of the antenna mast rotation mechanism 46 may be obtained using any suitable means. As a non-limiting example, position feedback of the antenna mast rotation mechanism 46 may be obtained by using an absolute encoder that may be embedded in the servo motor's drive axis. The absolute encoder is comprised of an integrated circuit that reads the rotational position of a magnet that is securely fastened to the gear located on the servo motor.

Figure 13A:
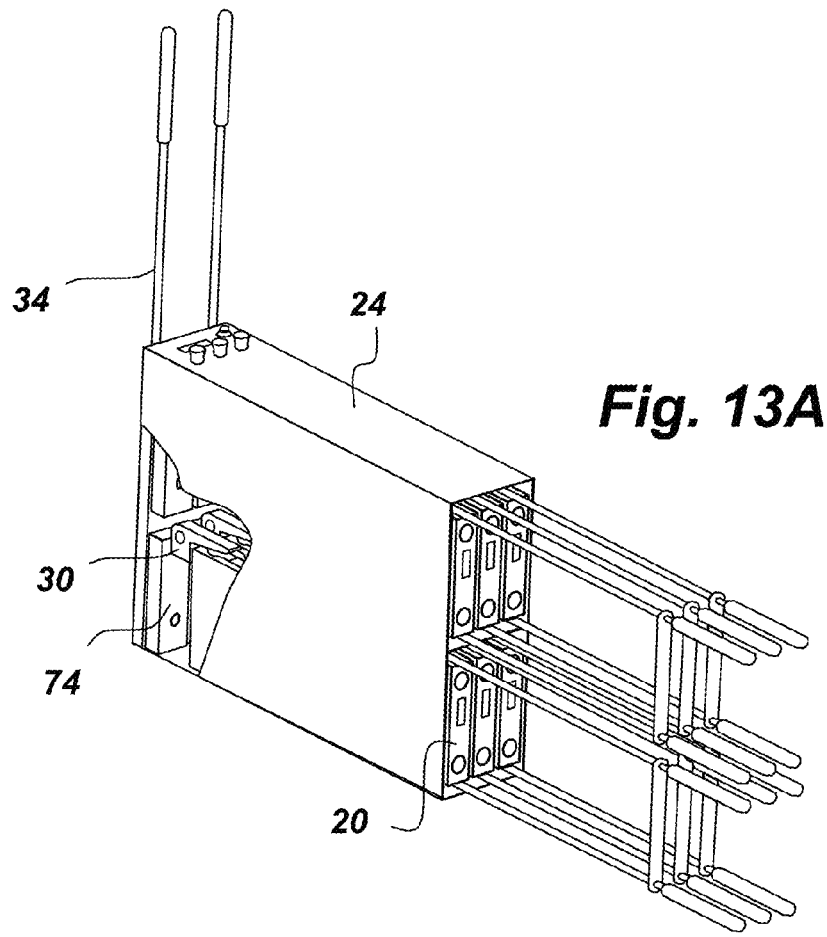
FIG. 13A is a perspective, cut-away view of multiple relay devices stowed in a deployer.
Figure 13B:
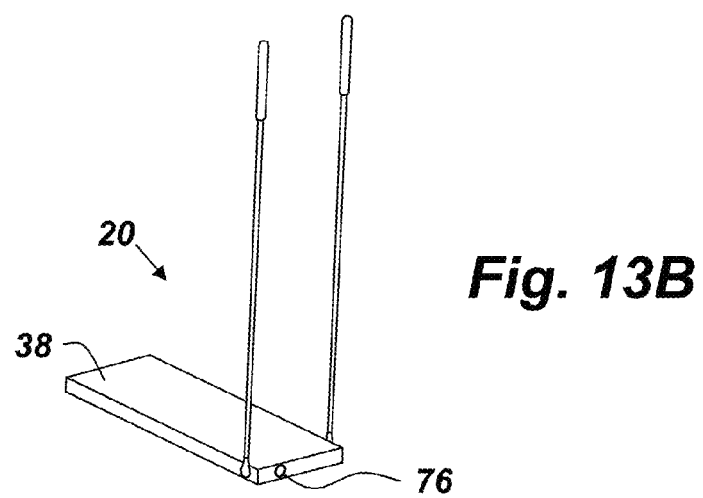
FIG. 13B is a perspective view of an embodiment of a relay device with raised antennas.

FIG. 13A shows a perspective, cut-away view of multiple relay devices 20 stowed in the deployer 24. Any desired number of relay devices 20 may be stowed in the deployer 24. For each relay device 20 held by the deployer 24, the deployer 24 may have a corresponding infrared data association (IrDA) transceiver 74 and a deployment mechanism 30. FIG. 13B shows how each relay device 20 may comprise an IrDA window 76 in the housing 38. The relay device 20 may bi-directionally communicate with its corresponding IrDA transceiver 74 via the IrDA window 76.

Figure 14:
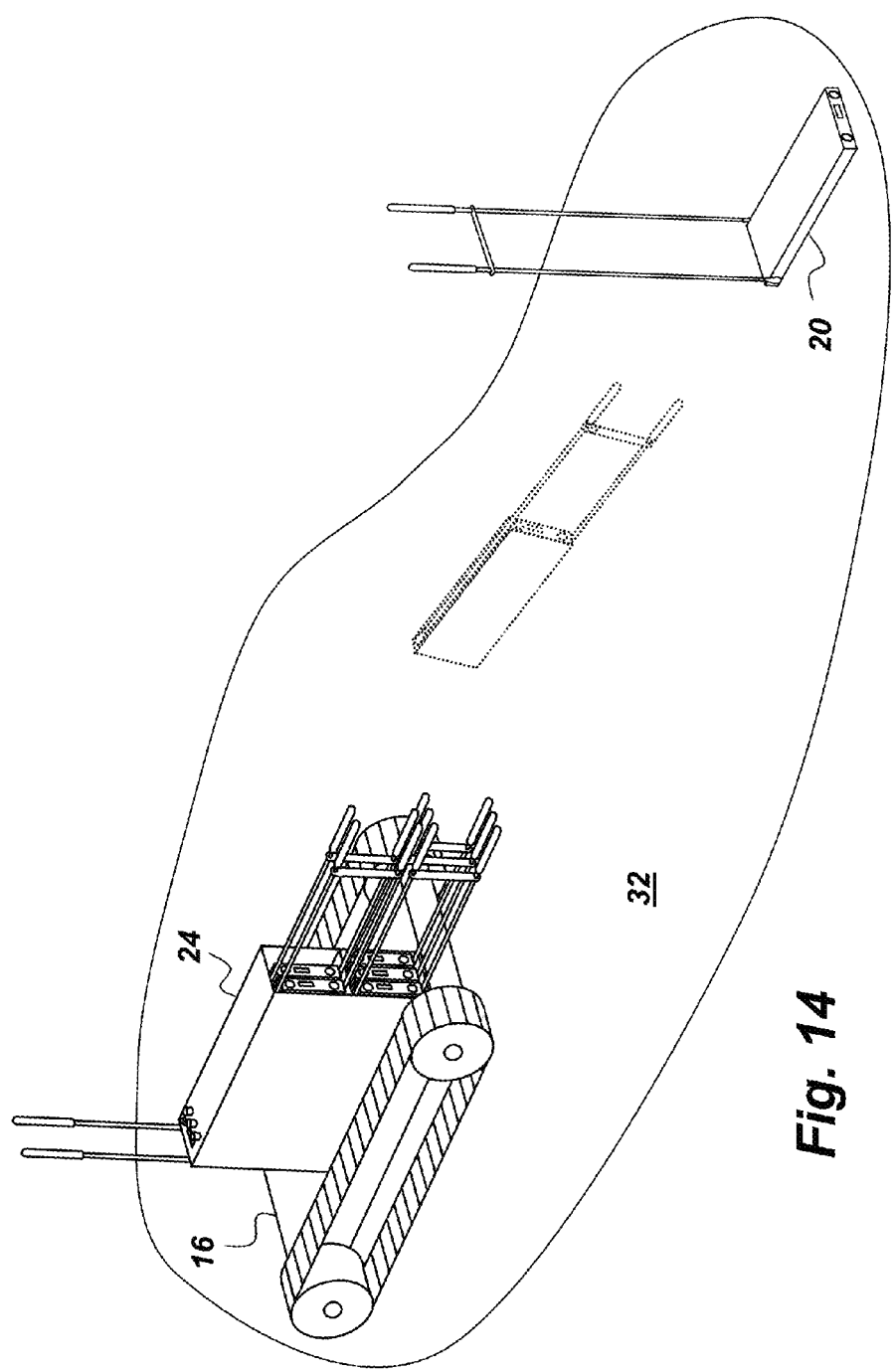
FIG. 14 is perspective view of an embodiment of a relay device deployment system for maintaining an ad hoc communications network between a mobile platform and a base station.

FIG. 14 is perspective view of a mobile platform 16 deploying a relay device 20 to the surface 32 while the mobile platform 16 is in motion. The relay device 20 may be ruggedized such that the relay device 20 will continue to operate after being dropped from the mobile platform 16 while the mobile platform 16 is in motion. In addition to being built to withstand shock forces, the relay device 20 may also be constructed to protect against the entry of moisture and contaminants into the housing 38 such that the relay device 20 may operate in outdoor environments. For example, the relay device 20 depicted in FIG. 12 has an Ingress Protection Rating (IPR) of at least 64. The relay device 20 may further comprise a global positioning system (GPS) receiver operatively coupled to the relay radio 40 such that the housing 38's geo-spatial coordinates may be transmitted to another node in the network 12.

Figure 15A:
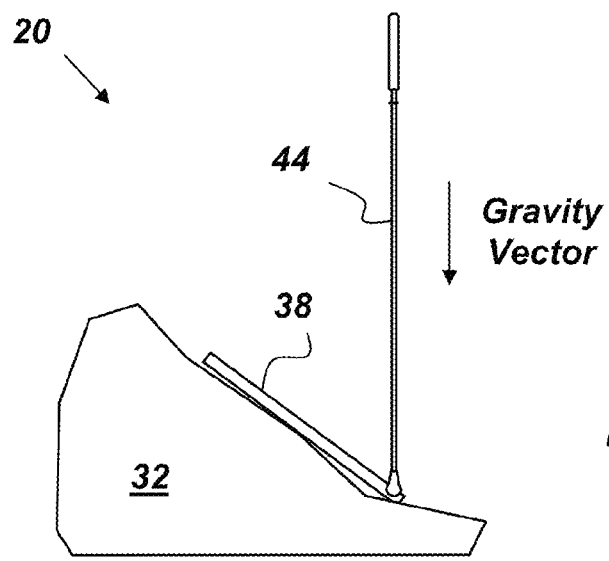
FIG. 15A is a side view of an embodiment of a relay device.
Figure 15B:
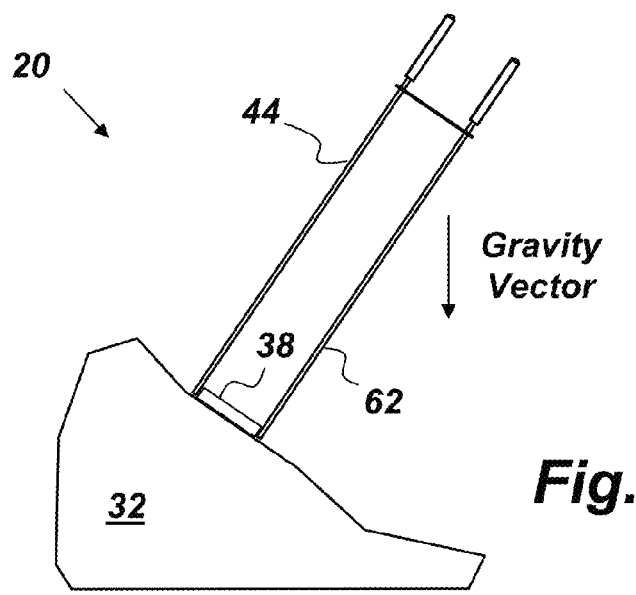
FIG. 15B is a side view of an embodiment of a relay device.

FIGS. 15A and 15B are side and front views respectfully of an embodiment of a relay device 20 resting on the support surface 32. In this embodiment, the support surface 32 is not level. FIG. 15A shows how once the housing 38 comes to rest on the surface 32 the antenna mast 44 may be raised to a position that is substantially parallel to the ambient gravity vector. The term "substantially parallel" includes scenarios such as that depicted in FIG. 15B where relay device 20 is deployed while the mobile platform 16 is travelling "sideways" along an inclined support surface 32. The antenna(s) on the relay device 20 may be raised to a height above the support surface 32 that is at least as high as the height from the support surface 32 to the top of the deployer antenna 34 such as is shown in, for example, FIGS. 3 and 14. Relay devices 20 having antennas below the height of the deployer antenna 34 may not be able to effectively enter the network 12.

Figure 16:
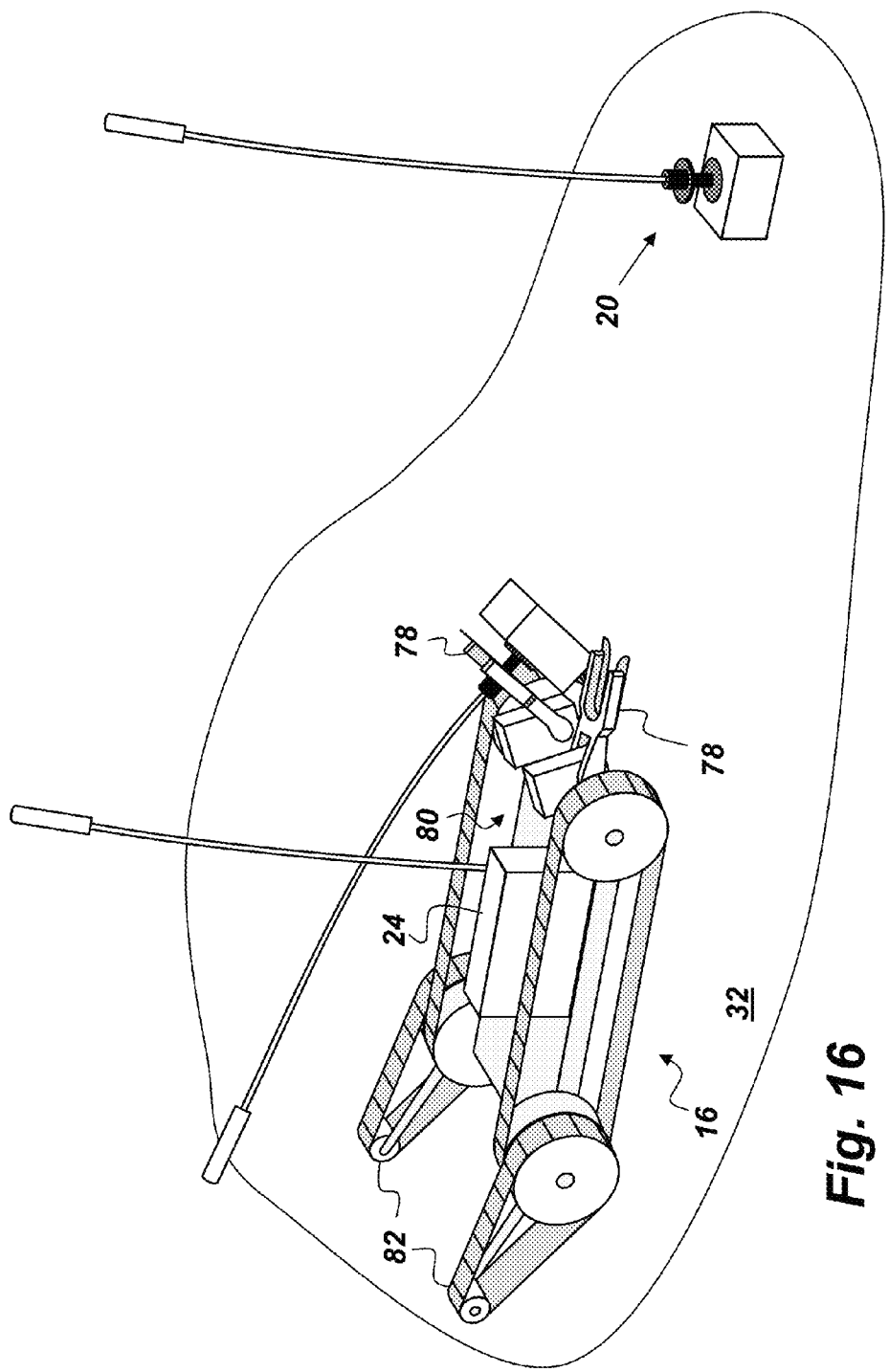
FIG. 16 is perspective view of an embodiment of a relay device deployment system for maintaining an ad hoc communications network between a mobile platform and a base station.

FIG. 16 is a perspective view of an embodiment of a system 22 that may be used with method 10. In this embodiment, the deployer 24 comprises motor-mounted fork assemblies 78 configured to selectively lower a given relay device 20 to the surface 32. The fork assemblies 78 are angularly offset from one another and may be mounted to a rear 80 of the mobile platform 16. In the embodiment of the mobile platform 16 shown in FIG. 16, the rear 80 is the end of the mobile platform 16 opposite a set of flippers 82. Method 10 does not require the mobile platform 16 to have flippers 82. When the embodiment of system 22 illustrated in FIG. 16 is used with method 10 the fork assemblies 78 are capable of retrieving a relay device 20 once it has been deployed to the surface 32 without a human operator having to approach the relay device 20. Once a deployed relay device 20 has been retrieved from the surface 32 by one of the fork assemblies 78, the relay device 20 may then be re-deployed to another location. In this manner, the network 12 may be established in a different area without a human having to touch the relay device 20.

Figure 17A:
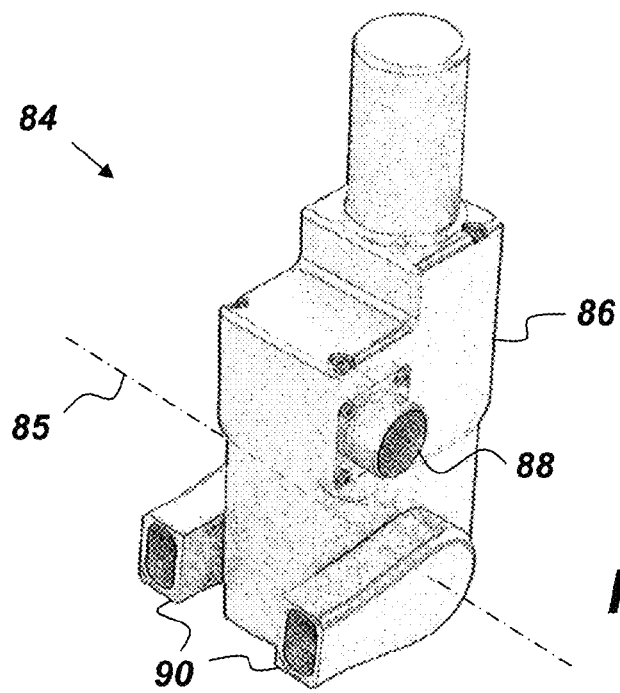
FIG. 17A is a perspective view of a motorized assembly.
Figure 17B:
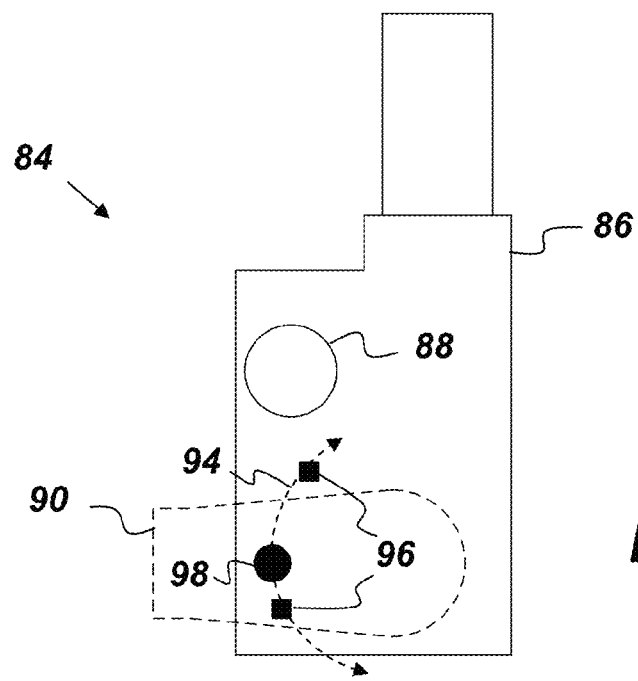
FIG. 17B is a side view of a motorized assembly.

FIGS. 17A and 17B depict a motorized assembly 84 that may be used in connection with the fork assemblies 78. Each motorized assembly 84 is capable of rotating sections of its corresponding fork assembly up and down through a single axis of rotation 85. The rear 80 of the mobile platform 16 is a convenient place to mount the fork assemblies 78 for the following purposes: (1) when mounted on the front of the mobile platform 16 the fork assemblies 78 may block sensors onboard the mobile platform such as a camera, (2) when mounted on the rear 80, the fork assemblies 78 may deploy a relay device 20 to the surface 32 while the mobile platform 16 is on the move, moving forward, and (3) when mounted on the rear 80, the fork assemblies 78 have minimal impact on mobile platform 16's manipulator (if so equipped), leaving the front of the mobile platform 16 free for the manipulator to move about. This can be important in explosive ordnance disposal missions where the mobile platform 16 is typically equipped with a manipulator, which is used to carry a charge in its gripper and to set the charge down near a suspected explosive device.

Referring to FIG. 17A, each motorized assembly 84 may comprise a motor housing 86, a power and data interface connector 88, and forklift arms 90. The motor housing 86 may contain a motor, a gearbox, and a worm gear assembly. The interface connector 88 may be used to supply power to the motor and to sensors in the fork assembly 78, and may also function as a data communication interface between the sensors in the fork assembly 78 and the deployer 24. For example, Hall Effect sensors may be used by method 10 to detect if a relay device 20 has been successfully deployed, as described in more detail below. The fork lift arms 90 provide a means to interface the motorized assembly 84 with a lifting fork 92. The fork lift arms 90 may be made to be hollow so that power can be supplied to additional sensors inside the fork 92 (discussed below). To prevent the arms 90 from being "back-driven" due to the moment produced by the weight of the relay device 20, a worm gear assembly may be used to connect the arms 90 to the motor. This is especially effective when the mobile platform 16 is traversing over rough terrain and experiencing higher vertical G-forces.

In FIG. 17B, the rotation path of one of the arms 90 is shown by the dashed line 94. To deploy a relay device 20 the arms 90 may be configured to rotate downward until the relay device 20 is disengaged from the fork 92. To stop the arms 90 from rotating beyond specific limit points along their rotation path a pair of Hall Effect sensors may be used as limit switches 96. A magnet 98 may be embedded into one or both of the arms 90 such that as the arm 90 reaches one of the limit points the magnet is in close proximity to one of the Hall Effect limit switches 96—thereby triggering the switch 96. The Hall Effect sensor limit switches 96 may be mounted on a printed circuit board that is inside the motorized assembly housing 86. The limit switches 96 need not be Hall Effect sensors, but could be any sensor capable of detecting the rotation of the arms 90. For example, one may include encoder feedback on the arms 90 to allow for positioning of the fork 92 at any desired angle.

Figure 18A:
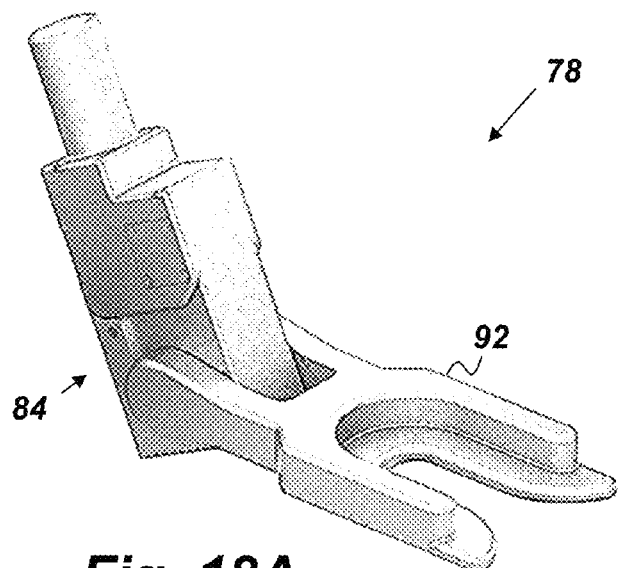
FIG. 18A is a perspective view of a motor-mounted fork assembly.
Figure 18B:
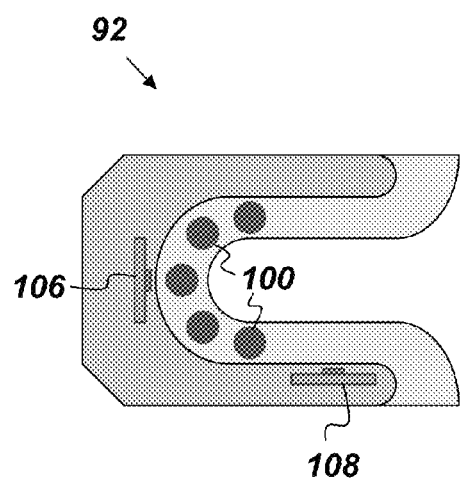
FIG. 18B is a top view of a lifting fork.
Figure 18C:
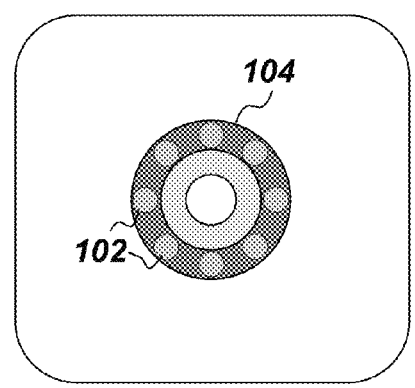
FIG. 18C is a top view of a relay device.

FIG. 18A is a perspective view of an embodiment of the fork assembly 78. FIG. 18B is a top view illustration of the lifting fork 92 shown in FIG. 18A. FIG. 18C is a top view illustration of an embodiment of the relay device 20 such as is depicted in FIG. 16. The forks 92 are designed to support the relay device 20. Several fork magnets 100 may be embedded into the fork 92. The relay device 20 may have magnets 102 embedded in a pick-up platform 104. The attraction force between the fork magnets 100 and platform magnets 102 keep the relay device 20 in place and prevent it from jumping off the fork 92 while the mobile platform 16 traverses along a rough terrain. Sensors may be strategically placed in the fork 92 to provide feedback as to the state of the relay device 20. For example, FIG. 18B shows an aft sensor 106 and a forward sensor 108 embedded in the fork 92. The aft sensor 106 and the forward sensor 108 may be any sensor capable of detecting the presence of the relay device 20. Suitable examples of fork sensors include, but is not limited to, Hall Effect sensors, electrical contacts (such as shorting pogo pins), proximity sensors, laser break sensors, etc. In the embodiment where the aft sensor 106 and the forward sensor 108 are Hall Effect sensors, they would each provide a low output when a magnetic field is present and high output when a magnetic field is not present. Outputs from the aft sensor 106 and the forward sensor 108 are fed back into a microcontroller in the deployer 24 that takes action based on the state of these outputs.

An example automated relay device 20 deployment process may be described as follows. First, the arms 90 rotate downward until the bottom of the relay device 20 makes contact with the support surface 32. Next, the arms 90 continue to rotate downward until they overcome the force of the magnetic attraction between the platform magnets 102 and the fork magnets 100 causing the fork to disengage from the relay device 20. The disengagement is detected by the aft sensor 106. At this point the arms 90 will not rotate up until the fork 92 has cleared the relay device 20. This happens when the mobile platform 16 moves forward causing the fork 92 to move away from the relay device 20. The forward sensor 108 detects when the fork 92 has sufficiently cleared the relay device 20, which causes the arm to rotate back up into stow mode.

Figure 19:
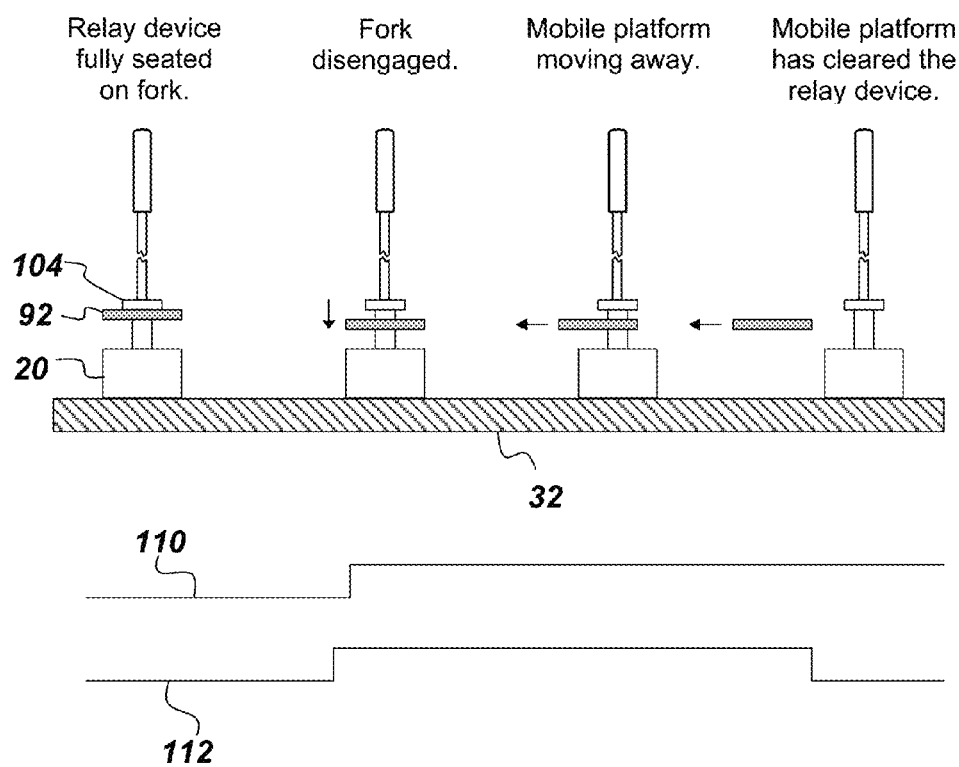
FIG. 19 is an illustration of sensor output states corresponding to a sequence of positions of a lifting fork and a relay device as the relay device is being deployed to a surface.

FIG. 19 is an illustration of a sequence of positions of a given fork 92 and relay device 20 as the relay device 20 is being deployed to the surface 32. FIG. 19 also illustrates the output states 110 and 112 of the aft sensor 106 and the forward sensor 108 respectively for each position. When the fork 92 is loaded with a relay device 20 the aft sensor output state 110 is low. When the relay device 20 is not present or disengages from the fork 92 during deployment, the aft sensor output state 110 goes high. When no relay device 20 is loaded on the fork 92 the forward sensor output state 112 is low, which low output state is due to the forward sensor 108 detecting the magnetic field from the fork magnets 100. When the relay device 20 is disengaged from, but still near, the fork 92 the forward sensor output state 112 is high, which high output state is due to disruption between the magnetic fields of the fork magnets 100 and the platform magnets 102. When the relay device 20 is loaded on the fork 92 the forward sensor output state 112 is low, which low output state is due to the forward sensor 108 detecting the combined and aligned magnetic fields from the fork magnets 100 and the platform magnets.

For the embodiment of the system 22 shown in FIG. 16, the deployer 24 may comprise power regulators, a radio, a microcontroller, and motor controllers. The power regulators serve to regulate power from a battery to provide power to the radio, microcontroller, and forklifts. The radio provides the communications link to the mobile platform 16 and also may be configured to communicate with the microcontroller. The microcontroller may be configured to execute commands received from the base station 14. An example command would be to deploy a relay device 20 as commanded by the operator. The microcontroller also may be configured to receive feedback from the sensors in each fork 92. The microcontroller may further be configured to take a certain action given a particular output state of a fork sensor, and/or to automatically deploy a relay device if certain conditions exist.

In an alternative embodiment two offset forks 92 may be mounted to the same motorized assembly 84 such that a single degree of freedom motor can control the placement and retrieval of two relay devices 20. There may be instances where three or more relay devices 20 are deployed in order to maintain the link between the mobile platform 16 and the base station 14. In such cases, the video quality may suffer resulting in a premature deployment of a relay device 20. If more than three relay devices 20 are used at a time, one can reduce the video resolution of the video data.

From the above description of method 10, it is manifest that various techniques may be used for implementing the concepts of method 10 without departing from its scope. The described embodiments are to be considered in all respects as illustrative and not restrictive. It should also be understood that method 10 is not limited to the particular embodiments described herein, but is capable of many embodiments without departing from the scope of the claims.

We claim:

1. A method of maintaining an ad hoc communications network between a base and a mobile platform as the mobile platform moves over a surface comprising the following steps:

a. providing a radio relay device;
   b. physically coupling a deployer to the mobile platform, wherein the deployer is configured to releasably stow the radio relay device;
   c. sending video data from the mobile platform to the base;
   d. monitoring the strength of a network signal received over time at the mobile platform and issuing a weak-link warning when the highest signal strength received at the mobile platform drops below a threshold value;
   e. once the weak-link warning has been issued, calculating video throughput data metrics based on video data received at the base over time, and issuing an imminent link-failure alert when the metrics reach a predefined condition, wherein the predefined condition is met when a first function $z_\kappa(\theta_\kappa)$ and a second function $z_x(\theta_x)$ are both less than zero, and wherein the first function is defined as $z_\kappa(\theta_\kappa) = \theta_0 + \theta_1 \kappa$, the second function is defined as $z_x(\theta_x) = \theta_0 + \theta_1 x_1 + \theta_2 x_2$, where $\kappa$ is the ratio $\mu/\sigma$, $\mu$ is the throughput data mean, $\sigma$ is the throughput variance, $x_1$ is the throughput data intercept, $x_2$ is the throughput data slope, and $\theta_0$, $\theta_1$, and $\theta_2$ are boundary line parameters;
   f. deploying the relay device from the deployer to the surface after the weak-link warning and the imminent link-failure alert are issued;
   g. providing a plurality of radio relay devices configured to be stowed and deployed by the deployer; and
   h. repeating steps (c) through (f) until all relay devices stowed in the deployer have been deployed.

2. The method of claim 1, wherein steps (c) through (f) are performed automatically by a processor without human involvement.

3. The method of claim 1, wherein each relay device is designed such that it may come to rest on the surface either upside-down or right-side-up, and wherein each relay device further comprises first and second antenna masts, and further comprising the step of:

upwardly rotating the first and second antenna masts to a raised position such that the height of the raised antenna masts is at least as tall as an antenna on the mobile platform.

4. The method of claim 1, further comprising the step of reducing video resolution of the video data if three or more relay devices have been deployed.

5. The method of claim 1, wherein the deployer comprises motor-mounted forks configured to selectively lower a given relay device to the surface, wherein the forks are angularly offset from one another.

6. The method of claim 1, further comprising the step of reducing video resolution of the video data if three or more relay devices have been deployed.

7. The method of claim 1, wherein the deployer comprises motor-mounted forks configured to selectively lower a given relay device to the surface, wherein the forks are angularly offset from one another.

8. The method of claim 7, wherein the deployer is mounted to a rear of the mobile platform.

9. The method of claim 7, wherein the motor-mounted forks comprise magnets configured to hold the given relay device against the forks when the given relay device is stowed and further configured to disengage from the given relay device as the given relay device is lowered to the surface.

10. The method of claim 9, further comprising the step of using a sensor to verify that the given relay device has disengaged from its corresponding fork during deployment of the given relay device to the surface.

11. The method of claim 10, wherein the forks are hollow.

12. The method of claim 7, wherein two forks are mounted to a single motor.

13. The method of claim 7, further comprising retrieving deployed relay devices off of the surface with the forks.

14. The method of claim 13, further comprising the steps of:
   using a sensor during deployment of a given relay device to the surface to verify that the given relay device has disengaged from its corresponding fork; and
   using the sensor during retrieval operations to verify that a given fork has engaged a deployed relay device.

15. The method of claim 11, wherein the forks are connected to a motor via a worm gear.

16. A method of maintaining an ad hoc communications network between a base and a mobile platform as the mobile platform moves over a surface comprising the following steps:
   a. providing a plurality of radio relay devices, wherein each relay device is designed such that it may come to rest on the surface either upside-down or right-side-up, wherein each relay device comprises first and second rotatable antenna masts;
   b. physically coupling a deployer to the mobile platform, wherein the deployer is configured to releasably stow the radio relay devices;
   c. sending video data from the mobile platform to the base;
   d. monitoring the strength of a network signal received over time at the mobile platform and issuing a weak-link warning when the highest signal strength received at the mobile platform reaches a threshold value;
   e. after the weak-ling warning has been issued, calculating a first function $z_\kappa(\theta_\kappa)$ and a second function $z_x(\theta_x)$ based on video throughput data received at the base over time, and issuing an imminent link-failure alert when the first function $z_\kappa(\theta_\kappa)$ and the second function $z_x(\theta_x)$ are both less than zero, wherein the first function is defined as $z_\kappa(\theta_\kappa)=\theta_0+\theta_1\kappa$, the second function is defined as $z_x(\theta_x)=\theta_0+\theta_1 x_1+\theta_2 x_2$, where $\kappa$ is the ratio $\mu/\sigma$, $\mu$ is the throughput data mean, $\sigma$ is the throughput data variance, $x_1$ is the throughput data intercept, $x_2$ is the throughput data slope, and $\theta_0$, $\theta_1$, and $\theta_2$ are boundary line parameters;
   f. deploying the relay device from the deployer to the surface after the weak-link warning and the imminent link-failure alert are issued;
   g. once a given relay device is deployed, upwardly rotating the antenna masts of the given relay device to a raised position such that tips of both antenna masts are separated from the surface by at least as much distance as an antenna on the mobile platform is separated from the surface; and
   h. with a processor, and without human involvement, repeating steps (c) through (g) until all relay devices stowed in the deployer have been deployed.

17. A method of maintaining an ad hoc communications network between a base and a mobile platform as the mobile platform moves over a surface comprising the following steps:
   a. providing a plurality of radio relay devices, each comprising an antenna;
   b. physically coupling a deployer to the mobile platform, wherein the deployer comprises a plurality of motor-mounted forks configured to releasably stow the radio relay devices;
   c. sending video data from the mobile platform to the base;
   d. monitoring the strength of a network signal received over time at the mobile platform and issuing a weak-link warning when the highest signal strength received at the mobile platform reaches a threshold value;
   e. after the weak-ling warning has been issued, calculating a first function $z_\kappa(\theta_\kappa)$ and a second function $z_x(\theta_x)$ based on video throughput data received at the base over time, and issuing an imminent link-failure alert when the first function $z_\kappa(\theta_\kappa)$ and the second function $z_x(\theta_x)$ are both less than zero, wherein the first function is defined as $z_\kappa(\theta_\kappa)=\theta_0+\theta_1\kappa$, the second function is defined as $z_x(\theta_x)=\theta_0+\theta_1 x_1+\theta_2 x_2$, where $\kappa$ is the ratio $\mu/\sigma$, $\mu$ is the throughput data mean, $\sigma$ is the throughput data variance, $x_1$ is the throughput data intercept, $x_2$ is the throughput data slope, and $\theta_0$, $\theta_1$, and $\theta_2$ are boundary line parameters;
   f. after the weak-link warning and the imminent link-failure alert are issued, deploying a relay device off a rear of the mobile platform by lowering a relay-device-holding fork toward the surface until the stowed relay device touches the surface and disengages from the lowered fork;
   g. with a processor, and without human involvement, repeating steps (c) through (f) until all relay devices stowed in the deployer have been deployed; and
   h. retrieving the deployed relay devices in turn by centering a lowered fork around each deployed relay device and lifting each relay device off the surface.

* * * * *